United States Patent
Wang et al.

(10) Patent No.: US 12,462,180 B2
(45) Date of Patent: Nov. 4, 2025

(54) PHOTON-NUMBER DEPENDENT HAMILTONIAN ENGINEERING FOR RESONATORS

(71) Applicants: The University of Chicago, Chicago, IL (US); Yale University, New Haven, CT (US)

(72) Inventors: Chiao-Hsuan Wang, Chicago, IL (US); Kyungjoo Noh, Pasadena, CA (US); José Lebreuilly, Blainville sur Mer (FR); Steven M. Girvin, Hamden, CT (US); Liang Jiang, Chicago, IL (US)

(73) Assignees: The University of Chicago, Chicago, IL (US); Yale University, New Haven, CT (US)

( * ) Notice: Subject to any disclaimer, the term of this patent is extended or adjusted under 35 U.S.C. 154(b) by 279 days.

(21) Appl. No.: 18/271,370

(22) PCT Filed: Jan. 31, 2022

(86) PCT No.: PCT/US2022/014603
§ 371 (c)(1),
(2) Date: Jul. 7, 2023

(87) PCT Pub. No.: WO2022/165364
PCT Pub. Date: Aug. 4, 2022

(65) Prior Publication Data
US 2024/0303520 A1 Sep. 12, 2024

Related U.S. Application Data

(60) Provisional application No. 63/144,230, filed on Feb. 1, 2021.

(51) Int. Cl.
*G06N 10/40* (2022.01)
*G06N 10/20* (2022.01)
(Continued)

(52) U.S. Cl.
CPC ............ *G06N 10/40* (2022.01); *G06N 10/20* (2022.01); *G06N 10/70* (2022.01); *H01P 7/06* (2013.01)

(58) Field of Classification Search
CPC ....................................................... G06N 10/40
(Continued)

(56) References Cited

U.S. PATENT DOCUMENTS

2018/0330260 A1* 11/2018 Bao .......................... G06N 5/02

OTHER PUBLICATIONS

Arrangoiz-Arriola, P. et al.; "Resolving the energy levels of a nanomechanical oscillator"; Nature, vol. 571; Jul. 25, 2019; 11 pages.
(Continued)

Primary Examiner — Tomi Skibinski
(74) Attorney, Agent, or Firm — Crowell & Moring LLP

(57) ABSTRACT

Cavity resonators are promising resources for quantum technology, while native nonlinear interactions for cavities are typically too weak to provide the level of quan¬ tum control required to deliver complex targeted operations. Here we investigate a scheme to engineer a target Hamiltonian for photonic cavities using ancilla qubits. By off-resonantly driving dispersively coupled ancilla qubits, we develop an optimized approach to engineering an arbitrary photon-number dependent (PND) Hamiltonian for the cavities while minimizing the operation errors. The engineered Hamiltonian admits various applications including canceling unwanted cavity self-Kerr interac¬ tions, creating higher-order nonlinearities for quantum simulations, and designing quantum gates resilient to noise. Our scheme can be implemented with coupled microwave cavities and transmon qubits in superconducting circuit systems.

20 Claims, 13 Drawing Sheets

(51) Int. Cl.
    *G06N 10/70* (2022.01)
    *H01P 7/06* (2006.01)
(58) Field of Classification Search
    USPC .......................................................... 327/528
    See application file for complete search history.

(56) References Cited

OTHER PUBLICATIONS

Albert, V. et al.; "Performance and structure of single-mode bosonic codes"; Physical Review A, vol. 97 (032346); The American Physical Society; Mar. 30, 2018; 30 pages.
Boissonneault, M. et al.; "Dispersive regime of circuit QED: Photon-dependent qubit dephasing and relaxation rates"; Physical Review A, vol. 79 (013819); The American Physical Society; Jan. 23, 2009;17 pages.
Dai, C.M. et al.; "Floquet theorem with open systems and its applications"; Physical Review A, vol. 93 (032121); The American Physical Society; Mar. 15, 2016; 6 pages.
Devoret, M.H. et al.; "Superconducting Circuits for Quantum Information: An Outlook"; downloaded from https://www.science.org at University of Chicago on Jun. 23, 2023; Science, vol. 339; Mar. 8, 2013; pp. 1169-1174.
Dutta, O. et al.; "Non-standard Hubbard models in optical lattices: a review"; Reports on Progress in Physics, vol. 78 (066001); May 28, 2015; 48 pages.
Gambetta, J. et al.; "Qubit-photon interactions in a cavity: Measurement-induced dephasing and number splitting"; Physical Review A, vol. 74 (042318); The American Physical Society; Oct. 17, 2006; 14 pages.
Gao, Y.Y. et al.; "Entanglement of bosonic modes through an engineered exchange interaction"; Nature, vol. 566; Feb. 28, 2019; 12 pages.
Goldman, N. et al.; "Periodically Driven Quantum Systems: Effective Hamiltonians and Engineered Gauge Fields"; Physical Review X, vol. 4; The American Physical Society; Aug. 18, 2014; 29 pages.
Gottesman, D. et al.; "Encoding a qubit in an oscillator"; Physical Review A, vol. 64, 012310; The American Physical Society; Jun. 11, 2001; 21 pages.
Grimsmo, A. L. et al.; "Quantum Computing with Rotation-Symmetric Bosonic Codes"; Physical Review X, vol. 10 (011058); The American Physical Society; Mar. 6, 2020; 32 pages.
Grimm, A. et al.; "Stabilization and operation of a Kerr-cat qubit"; Nature, vol. 584; Aug. 13, 2020; 7 pages.
Haas, H. et al.; "Engineering effective Hamiltonians"; New Journal of Physics, vol. 21 (103011); Oct. 4, 2019; 40 pages.
Hartmann, M.J. et al.; "Quantum simulation with interacting photons"; Journal of Optics, vol. 18; IOP Publishing Ltd; Sep. 16, 2016; 28 pages.
Heeres, R.W. et al.; "Cavity State Manipulation Using Photon-Number Selective Phase Gates"; Physical Review Letters, vol. 115,137002; American Physical Society; Sep. 22, 2015; 5 pages.
Heeres, R.W. et al.; "Implementing a universal gate set on a logical qubit encoded in an oscillator"; Nature Communications, 8:94; DOI: 10.1038/s41467-017-00045-1; Jul. 21, 2017; 7 pages.
Johnson, B.R. et al.; "Quantum non-demolition detection of single microwave photons in a circuit"; Nature Physics, vol. 6; Sep. 2010; 5 pages.
Kapit, E.; "Error-Transparent Quantum Gates for Small Logical Qubit Architectures"; Physical Review Letters, vol. 120 (050503); The American Physical Society; Feb. 1, 2018; 5 pages.
Kapit, E.; "Hardware-Efficient and Fully Autonomous Quantum Error Correction in Superconducting Circuits"; Physical Review Letters, vol. 116 (150501); The American Physical Society; Apr. 12, 2016; 5 pages.
Kirchmair, G. et al.; "Observation of quantum state collapse and revival due to the single-photon Kerr effect"; Nature, vol. 495; Mar. 14, 2013; 5 pages.

Kjaergaard, M. et al.; "Superconducting Qubits: Current State of Play"; downloaded from www.annualreviews.org at University of Chicago Libraries on Jun. 23, 2023; Annual Reviews, Annual Review of Condensed Matter Physics, vol. 11, 2020; Dec. 17, 2019; pp. 369-395.
Koch, J. et al.; "Charge-insensitive qubit design derived from the Cooper pair box"; Physical Review A, vol. 76 (042319); The American Physical Society; Oct. 12, 2007; 19 pages.
Krantz, P. et al.; "A quantum engineer's guide to superconducting qubits"; Applied Physics Reviews, vol. 6, 021318; Jun. 17, 2019; 58 pages.
Krastanov, S. et al.; "Universal control of an oscillator with dispersive coupling to a qubit"; Physical Review A, vol. 92 (040303(R)); American Physical Society; Oct. 21, 2015; 5 pages.
Lebreuilly, J. et al.; "Autonomous quantum error correction and quantum computation"; arXiv prepring arXiv:2103.05007; Mar. 8, 2021; 18 pages.
Lei, C.U. et al.; "High coherence superconducting microwave cavities with indium bump bonding"; downloaded from http://pubs.aip.org/aip/apl/article-pdf/doi/10.1063/5.0003907/13091743/154002_1_onlin.pdf; Applied Physics Letters, 116; 154002; Apr. 15, 2020; 6 pages.
Lihm, J-M. et al.; "Implementation-independent sufficient condition of the Knill-Laflamme type for the autonomous protection of logical qudits by strong engineered dissipation"; Physical Review A, vol. 98 (012317); The American Physical Society; Jul. 16, 2018; 8 pages.
Ma, Y. et al.; "Error-transparent operations on a logical qubit protected by quantum error correction"; Nature Physics, vol. 16; Aug. 2020; 6 pages.
Ma, W-L. et al.; "Path-Independent Quantum Gates with Noisy Ancilla"; Physical Review Letters, vol. 125 (110503); The American Physical Society; Sep. 9, 2020; 7 pages.
Michael, M. et al.; "New Class of Quantum Error-Correcting Codes for a Bosonic Mode"; Physical Review X, vol. 6 (031006); The American Physical Society; Jul. 14, 2016; 26 pages.
Mirrahimi, M. et al.; "Dynamically protected cat-qubits: a new paradigm for universal quantum computation"; New Journal of Physics, vol. 16 (2014) 045014; Apr. 22, 2014; 31 pages.
Nielsen, M.A. et al.; Quantum Computation and Quantum Information, 10th Anniversary Edition; Cambridge University Press; 978-1-107-00217-3; frontmatter; 2010; 30 pages.
Noh, C. et al.; "Quantum simulations and many-body physics with light"; Reports on Progress in Physics, vol. 80; Nov. 4, 2016; 37 pages.
Ofek, N. et al.; "Extending the lifetime of a quantum bit with error correction in superconducting circuits"; Nature, vol. 536; Aug. 25, 2016; pp. 441-445.
Rahav, S. et al.; "Effective Hamiltonians for periodically driven systems"; Physical Review A, vol. 68 (013820); The American Physical Society; Jul. 28, 2003; 18 pages.
Reagor, M. et al.; "Reaching 10 ms single photon lifetimes for superconducting aluminum cavities"; Applied Physics Letters, vol. 102 (192604); May 16, 2013; 5 pages.
Reinhold, P. et al.; "Error-corrected gates on an encoded qubit"; Nature Physics, vol. 16; Aug. 2020; 6 pages.
Rosenblum, S. et al.; "Fault-tolerant detection of a quantum error"; Science, vol. 361; Jul. 20, 2018; 5 pages.
Schirmer, S.G.; "Hamiltonian Engineering for Quantum Systems"; InLagrangian ancl Hamiltonian Methods for Nonlinear Control; 2006; 6 pages.
Schoelkopf, R.J. et al.; "Wiring up quantum systems"; Nature, vol. 451; Feb. 7, 2008; pp. 664-669.
Schuster, D.I. et al.; "Resolving photon number states in a superconducting Circuit"; Nature, vol. 445; Feb. 1, 2007; 4 pages.
Scopa, S. et al.; "Exact solution of time-dependent Lindblad equations with closed algebras"; Physical Review A, vol. 99 (022105); The American Physical Society; Feb. 5, 2019; 14 pages.
Sletten, L.R. et al.; "Resolving Phonon Fock States in a Multimode Cavity with a Double-Slit Qubit"; Physical Review X, vol. 9 (121056); The American Physical Society; Jun. 20, 2019; 9 pages.

(56) References Cited

OTHER PUBLICATIONS

Vy, O. et al.; "Error-transparent evolution: the ability of multi-body interactions to bypass decoherence"; New Journal of Physics, vol. 15 (053002); May 7, 2013; 14 pages.
Wang, C.S. et al.; "Efficient Multiphoton Sampling of Molecular Vibronic Spectra on a Superconducting Bosonic Processor"; Physical Review X, vol. 10 (021060); The American Physical Society; Jun. 17, 2020; 18 pages.
Xu, Y. et al.; "Demonstration of Controlled-Phase Gates between Two Error-Correctable Photonic Qubits"; Physical Review Letters, vol. 124 (120501); The American Physical Society; Mar. 24, 2020; 7 pages.

\* cited by examiner

PHOTON-NUMBER DEPENDENT HAMILTONIAN ENGINEERING FOR RESONATORS

CROSS REFERENCE

This Patent Application is based on and claims the benefit of priority to the PCT International Patent Application No. PCT/US2022/014603 filed on Jan. 31, 2022, which is based on and claims the benefit of priority to the U.S. Provisional Patent Application No. 63/144,230, filed on Feb. 1, 2021, the entireties of which are herein incorporated by reference.

GOVERNMENT FUNDING

This invention was made with government support under DE-SC0019406 awarded by the U.S. Department of Energy, W911NF-18-1-0020, W911NF-18-1-0212, W911NF-15-2-0067, and W911NF-16-1-0349 awarded by the Army Research Laboratory-Army Research Office, FA9550-15-1-0015, and FA9550-19-1-0399 awarded by the Air Force Office of Scientific Research, and 1936118, and 1640959 awarded by the National Science Foundation. The government has certain rights in the invention.

FIELD OF THE INVENTION

This disclosure relates to a method and system for controlling properties of electromagnetic resonators coupled to ancilla qubits for quantum information processing and quantum simulation.

BACKGROUND OF THE INVENTION

Electromagnetic resonators (alternatively referred to as cavities) support electromagnetic resonance modes and may be used as a platform for applications such as quantum information processing and simulation of many-body quantum mechanical systems. These applications generally rely on quantum operations across a plurality of photon-number states of the cavity. Such quantum operations may be facilitated by highly nonlinear interactions among these photon-number states. However, native nonlinear interactions among photons in a cavity may be weak and untunable.

SUMMARY OF THE INVENTION

A toolbox is implemented and developed for photon-number dependent Hamiltonian engineering by off-resonantly driving ancilla qubit(s) of electromagnetic cavities. A general approach to design and optimize the drive fields for engineering arbitrary single-cavity target Hamiltonian and performing quantum operations is provided, with examples including three-photon interaction, parity-dependent energy, error-transparent Z-rotation for rotation-symmetric bosonic qubits, and cavity self-Kerr cancellation. This scheme is also generalized to implement error-transparent controlled-rotation between two cavities. The flexible and thus highly nonlinear engineered Hamiltonian for photons enables versatile applications for quantum simulation and quantum information processing. As examples, these schemes can be implemented with dispersively coupled microwave cavities and transmon qubits in the cQED platform.

BRIEF DESCRIPTION OF THE DRAWINGS

For a more complete understanding of the invention, reference is made to the following description and accompanying drawings, in which.

DETAILED DESCRIPTION

Figure 1:
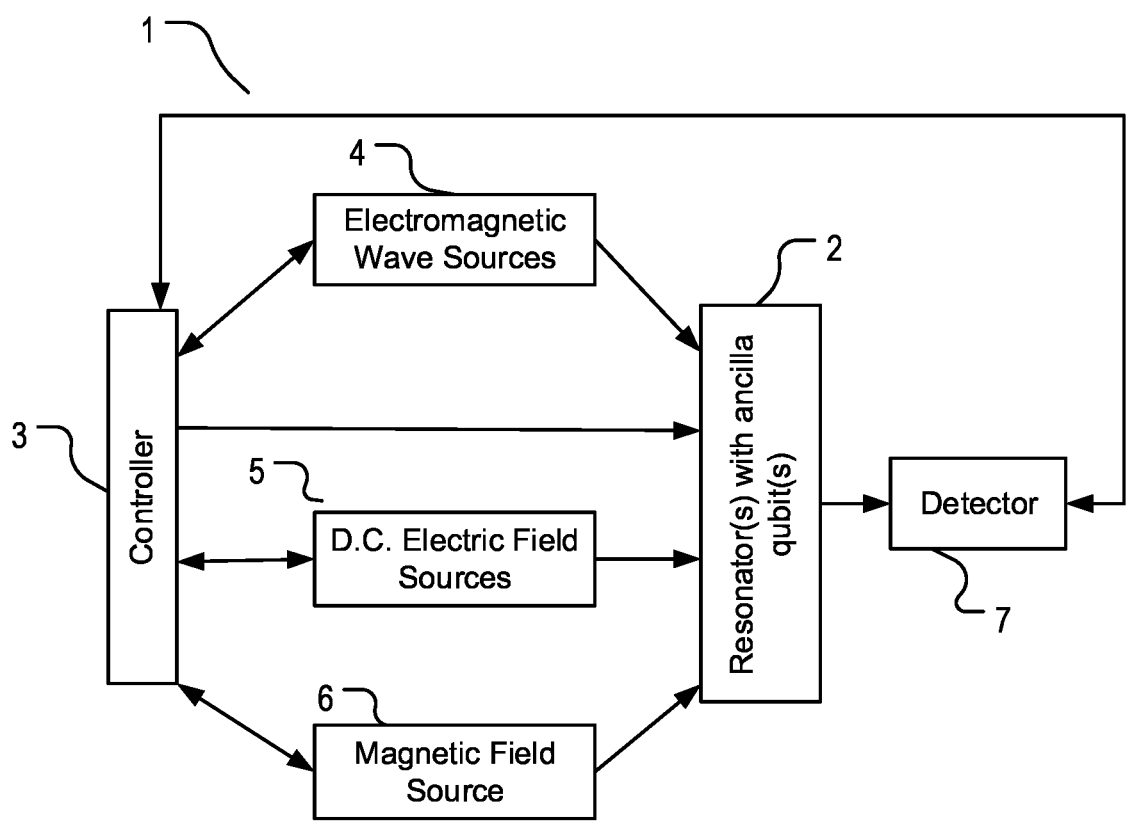
FIG. 1 illustrates an example system for engineering a photon-number dependent Hamiltonian in a cavity.

Quantum information processing or many-body quantum simulation applications may be implemented in a platform containing one or more electromagnetic cavities (alternatively referred to as electromagnetic resonators, or resonators for brevity throughout this disclosure). These resonators may support photon-number states in their cavity electromagnetic modes with controllable energies (or resonant frequencies). Logical quantum bits (qubits) may be coded as coherent superpositions of these photon-number states. Quantum operations on these logical qubits may be implemented for quantum information processing and quantum simulation purposes. Each resonator may be associated with an infinite-dimensional Hilbert space. Such an infinite-dimensional Hilbert space of a single resonator, for example, may enable flexible design of quantum error correction codes and result in extension of logical qubit lifetime and coherence time. As such, the rapidly growing Hilbert space of the resonators may be controlled to perform quantum operations for quantum information processing and for emulating the dynamics of the classically intractable many-body quantum systems. These quantum operations may be facilitated by some types of highly nonlinear interactions among the photon-number states of the resonators. However, native nonlinear interactions among photons in a resonator may be too weak and untunable for these quantum operations.

In the implementations of this disclosure described in more detail below, ancilla qubit(s) coupled to one or more resonators and driven by engineered external electromagnetic fields (alternatively referred to as controlled drives) are used to control the nonlinear interactions of photons in the one or more resonators to facilitate the various quantum operations as needed for a particular quantum information processing or quantum simulation task. Specifically, the frequency components and magnitude, phase, and timing of each frequency component of the external electromagnetic fields may be controlled to drive the ancilla qubit(s) to achieve an engineered interaction represented by a particular target photon-number dependent (PND) Hamiltonian. As such, a toolbox is implemented and developed for engineering a PND Hamiltonian for a resonator-ancilla qubit system. In some example implementations, a target PND Hamiltonian is engineered by off-resonantly driving the ancilla qubit(s) to minimize adverse effect from excitation of excited states of the ancilla qubit(s). A general approach to design and optimize the drive fields for engineering arbitrary a single-cavity target Hamiltonian and performing quantum operations is provided, with examples including target Hamiltonians for emulating three-photon interaction, parity-dependent energy levels, and error-transparent Z-rotation for rotation-symmetric bosonic qubits, and for achieving cancellation of cavity self-Kerr effect. This scheme is also generalized to implement error-transparent controlled-rotation between two coupled cavities. The flexible and thus engineered highly nonlinear Hamiltonian for photon interactions enables versatile applications for quantum simulation and quantum information processing.

FIG. 1 shows an example system 1 for implementing Hamiltonian engineering in an electromagnetic resonator platform. The system 1 includes a resonator-ancilla qubit system 2, a controller 3, one or more electromagnetic wave sources 4, one or more D.C. electric field sources 5, one or more magnetic field sources 6, and one or more detectors 7. In some implementations, the system 1 may include at least the resonator-ancilla qubit system 2 and the electromagnetic wave sources 4, and may further optionally include one or more of the other components above.

In FIG. 1, the controller 3 may be of any form of dedicated circuits, general-purpose instruments, and mobile or fixed electronic devices including but not limited to desktop computer, laptop computers, tablets, mobile phones, personal digital assistants, and the like. The controller 3 may be configured to provide a user interface for controlling the Hamiltonian engineering in the resonator-ancilla qubit system 2. The controller 3 may include communication interfaces, processors, input/output (I/O) interfaces, storages, and display circuitry. The controller 3 may communicate with one or more of the other components of the system 1 to trigger operations and to send/receive commands, data, or the like, as shown by the various arrows in FIG. 1 connecting the controller 3 to other components of the system 1.

The electromagnetic wave sources 4 of FIG. 1 may be of any type of sources for generating electromagnetic radiation in various suitable and controllable spectral ranges. The electromagnetic wave sources 4 may include one or more signal generators, electromagnetic transducers/amplifiers, inductive/capacitive devices, terahertz wave generator, and/or optical emitters (e.g., arc lamps, lasers, light emitting diodes). In some implementations, frequency components of the output electromagnetic fields including frequencies, magnitudes, and phases may be adjusted/controlled via the electromagnetic wave sources 4. For example, the output electromagnetic fields may include radio-frequency waves and microwaves in, e.g., 10 KHz-300 GHz, inclusive. For another example, the output electromagnetic fields may include optical waves in the visible, infrared, and/or ultraviolet spectral ranges. For yet another example, the output electromagnetic fields may include terahertz waves. The output electromagnetic fields (alternatively referred to as control drives) may be directed to the resonator-ancilla system 2, via free space, transmission lines, microwave guides, optical fibers, or any other suitable means. The output electromagnetic fields may be further manipulated (e.g., focused, collimated, and the like using optical/microwave components) before being directed to the resonator-ancilla qubit system 2. The timing of the electromagnetic fields may be further controlled. For example, the electromagnetic field may be turned on and off abruptly or ramped up and down smoothly or adiabatically. The electromagnetic fields may be focused and may be spatially scanned to select different regions of the resonator-ancilla qubit system 2.

The system 1 may optionally include the D.C. electric or magnetic sources 5 and/or 6. The D.C. sources 5 and/or 6 may be used to generate and apply D.C. electric and/or magnetic fields to the ancilla qubits to modify the energy levels of the quantum states and/or to mix quantum states in the ancilla qubits. For example, a D.C. electric field may be applied for device characterization, e.g., for characterizing D.C. Stark effect on the various quantum states in the ancilla qubits. For another example, a magnetic field may be applied to induce energy level splitting. The D.C. electric and or magnetic fields for any of the purposes above may be applied to the entire or a particular region of the resonator-ancilla qubit system 2.

The resonator-ancilla qubit system 2 of FIG. 1 may include one or more resonators and one or more ancilla qubits. The resonators, for example, may be implemented in the form of microwave resonators, or optical resonators, or the like. A microwave cavity, for example, may be implemented as a planar or three-dimensional superconducting microwave resonator, as described in more detail in the examples given in relation to FIG. 2 and FIG. 3. The ancilla qubits may each include a device having at least two quantum levels. Each ancilla qubits may be coupled to one or more of the resonators in a particular manner. Specific examples are given in the disclosure below in relation to FIG. 2 and FIG. 3.

The detectors 7 of FIG. 1 may be configured to perform readout and/or other measurements of the resonator-ancilla qubit system 2. In the microwave spectral range, for example, the readout detector may include additional resonator circuits controllably coupled to the resonator-ancilla qubit system for measuring output microwave photons. The readout detector may be associated with other microwave signal filtering and mixing components. The readout detectors may be controlled via the controller 3. In optical spectral range, optical detectors may be implemented for measuring optical emission from the resonator-ancilla qubit system in the form of one or more devices including but not limited to photo diodes, photomultiplier tubes (PMT), microchannel plates, charge-coupled devices (CCDs), and complementary metal-oxide semiconductor (CMOS) sensors. The optical detectors may be configured to detect single or multiple optical photons. The optical detectors may include additional and or auxiliary components including power supplies, electric bias circuit, active or passive quenching circuit, and the like. The optical detector 140 may further include other optical components for collection and processing of the optical signal from the resonator-ancilla qubit system 2, including but not limited to spectral filters (such as spectrometers and dielectric/metal-film filters with suitable optical pass bands) and microscope optics (such as confocal optical microscope and multiple-photon microscope.

Figure 2:
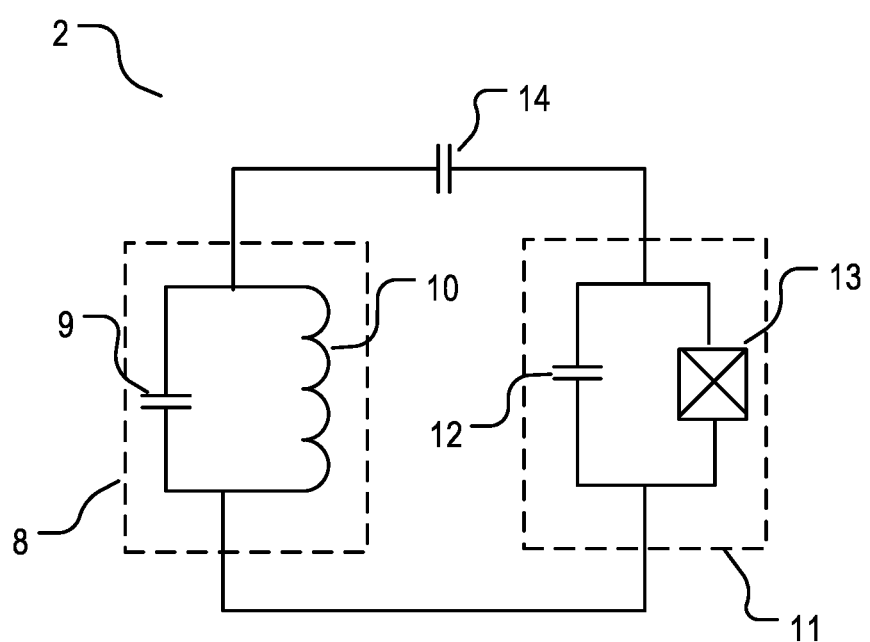
FIG. 2 illustrates an example microwave cavity coupled to an ancilla qubit.

As an example for the resonator-ancilla qubit system 2 of FIG. 1, FIG. 2 shows a single microwave resonator 8 capacitively coupled to an ancilla qubit 11 via a coupling capacitor 14. The single microwave resonator 8, for example, may be implemented as an LC circuit including a capacitor 9 and an inductor 10. Such an LC resonator, for example, may be implemented as a planar or three-dimensional superconducting resonator.

The ancilla qubit 11 may be implemented as, for example, a superconducting phase, charge, or magnetic flux qubit, or their hybridization, such as a fluxonium, a transmon, a xmon, or a quantronium. These superconducting ancilla qubits may rely on one or more Josephson junctions for providing an harmonic electron energy levels. FIG. 2 shows an example transmon qubit that includes a capacitor 12 and an electron cooper-pair box in a form of capacitively shunted Josephson junction 13.

Figure 3:
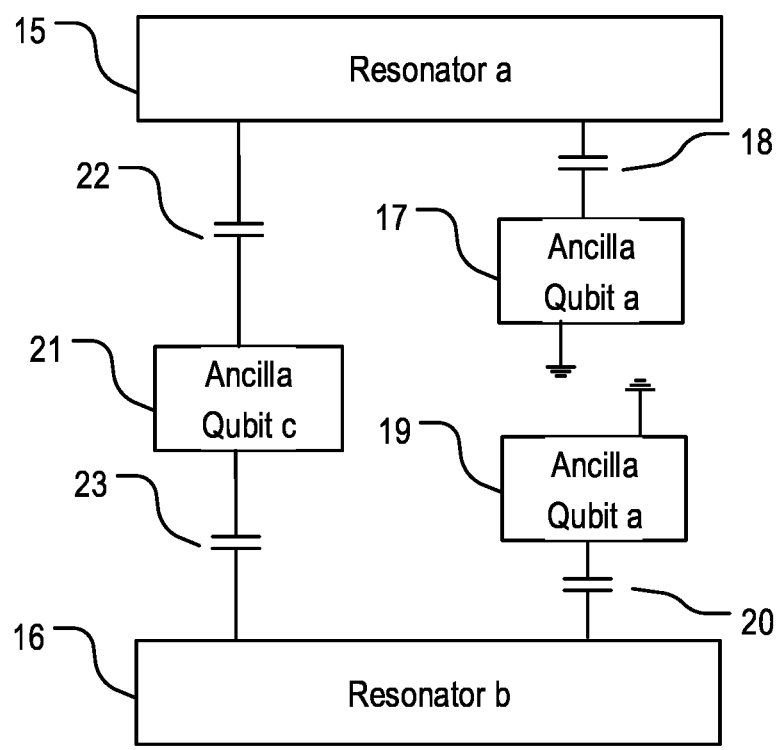
FIG. 3 illustrates two coupled microwave cavities with three ancilla qubits.

As another example for the resonator-ancilla qubit system 2 of FIG. 1, FIG. 3 shows two microwave resonators 15 and 16, denoted as resonator a and resonantor b, respectively. The microwave resonators 15 and 16 may be capacitively coupled to an ancilla qubit 17 (labeled as ancilla qubit a) and an ancilla qubit 19 (labeled as ancilla qubit b) via a coupling capacitors 18 and 20, respectively. The two microwave resonators 15 and 16 may further be coupled via a third ancilla qubit 21 (labeled as ancilla qubit c) and capacitors 22 and 23, as illustrated in FIG. 3. Each of the microwave resonators 15 and 16, for example, may be implemented as a superconducting LC circuit including a capacitor and an inductor, similar to the single microwave resonator 8 of FIG. 2. Each of the ancilla qubits 17 and 19 likewise may be implemented as, for example, a superconducting phase, charge, or magnetic flux qubit, or their hybridization, such as a fluxonium, a transmon, a xmon, or a quantronium. These superconducting ancilla qubits may rely on one or more Josephson junctions for providing an harmonic electron energy levels.

Other components may be coupled to each of resonator-ancilla qubit systems shown in FIG. 2 and FIG. 3. For example, additional superconducting transmission line resonators may be included for coupling controlled microwave signals for initialization, operation, driving, and readout of the resonators 8, 15, and 16, and ancilla qubits 11,17, 19, and 21. Metal traces in the entire resonator-ancilla qubit systems 2 of FIG. 2 and FIG. 3 may include one or more superconducting materials, e.g., aluminum or niobium. The resonator-ancilla qubit systems 2 of FIG. 2 and FIG. 3 may be placed at a temperature lower than a threshold for achieving superconductivity in the one or more superconducting materials.

The resonator-ancilla qubit system shown in FIG. 2 and FIG. 3 may be implemented as a planar or three-dimensional circuit Quantum Electrodynamics (cQED) system. The various superconducting components therein may be fabricated by various means. For example, these components may be lithographically patterned on a planar substrate.

Each of the microwave resonators may be associated with a cavity mode having a resonance frequency, as determined, for example by the inductance and capacitance of the resonator. In some implementations, the inductance and or capacitance of a resonator may be adjustable. Quantum mechanically, such a microwave resonator may be characterized by various photon-number states, each representing a number of microwave photons in the cavity mode. These photon-number states may be denoted by $|0\rangle$, $|1\rangle$, ..., $|n\rangle$, wherein n represents the number of photons in a particular photon-number state. Quantum information may be based on a logic qubit in such a resonator which may be coded as a coherent superposition of the photon-number states.

Each of the ancilla qubit above may include multiple quantum levels. Energy spacing between adjacent levels may be sufficiently different such that a transition between two of the multiple quantum levels may be selectively addressed by an external drive field without being significantly affected by the presence of other quantum levels. For example, as described above, the ancilla qubit may be implemented as a transmon, in which a normally harmonic cooper-pair box (having energy levels with equal spacing) is modified to include capacitive shunting of the Josephson junction therein to create anharmonicity in the energy levels. The two levels among the multiple levels may be selected as the basis states of the ancilla qubit. A corresponding microwave transition between the two levels is characterized by a microwave frequency corresponding to the energy spacing between these two quantum levels. The lower energy level of the two levels may be referred to as the ground state, denoted by $|g\rangle$, whereas the higher energy level of the two levels may be referred to as the excited state, denoted by $|e\rangle$. The resonant frequency between the ground state $|g\rangle$ and the excited state $|e\rangle$ of the uncoupled ancilla qubit may be represented by $\omega_q$.

The coupling strength between a microwave resonator and an ancilla qubit as described above may be configured at various levels. For example, the coupling may be in the dispersive regime, as described in more detail below. In other words, the resonance frequency of the microwave resonator and the two-level transition frequency are sufficiently detuned such that the coupling between the resonator and the ancilla qubit is in the dispersive regime. Under such dispersive coupling, as described in more detail below, the resonant frequencies of the ancilla qubit between the ground state g) and the excited state e) may become a series of resonances wan each shifted from the its uncoupled resonant frequency by a amount $\chi n$, where $\chi$ represents the dispersive coupling strength between the resonator and the ancilla qubit and n represents the photon-number in the resonator, i.e., $\omega_{q,n} = \omega_q - \chi n$. Quantum evolution of such a dispersively coupled resonator-ancilla qubit system may be described by a Hamiltonian including a dispersive interaction linear in photon-number. For another example, the coupling between the resonator and the ancilla qubit may be stronger and thus nonlinear interactions (e.g. quadratic to photon-number) of higher order than dispersive coupling may need to be included in the Hamiltonian. A cavity self-Kerr term which is also quadratic to photon-number would also be included in the Hamiltonian.

The ancilla qubit may be further driven by external electromagnetic fields. Such external electromagnetic fields may be alternatively referred to as control fields or drive fields. Field parameters or knobs that may be controlled in the drive fields include, for example, the number of frequency components and the frequencies, magnitude, and phase of these frequency components, Further, timing of the drive field may be controlled. For example, the drive fields may be abruptly applied to the ancilla qubit. For another example, the drive fields may be gradually or adiabatically turned on and off. The presence of the drive fields modifies the Hamiltonian of the coupled resonator-ancilla qubit system by including additional interactions with the drive fields. By controlling the various field parameters of the drive fields, a desired target Hamiltonian due to the driven coupled ancilla qubit having a PND nonlinear photon-photon interaction may be engineered and the quantum state of the coupled resonator-ancilla system under the drive fields would evolve as dictated by the target Hamiltonian.

In some implementations, a specific target Hamiltonian may be generated to depend nonlinearly on photon-numbers in the resonator by adjusting the field parameters of the drive fields in the dispersive regime. Such a photon-number dependent (PND) Hamiltonian may include engineered nonlinear photon-photon interactions (that is otherwise not attainable via native nonlinear interactions in the coupled resonator-ancilla qubit system) underlying quantum evolution of various quantum operation in quantum information processing or quantum simulation.

In some implementations, the field parameters of the drive fields may be optimally determined for a particular target Hamiltonian such that the excitation and effect from excited population in the excited state |e⟩ of the ancilla qubit may be minimized. By minimizing the excited state population in the ancilla qubit, dephasing of the resonator photon-number states caused by the decoherence of the ancilla qubit may also be minimized.

In some example implementations, the field parameters of the drive fields may be determined for a particular target Hamiltonian in which the self-Kerr nonlinearity of the resonator described above is canceled as a result of driving the ancilla qubit by the drive fields. The self-Kerr nonlinearity is usually undesired as it reduces fidelity of quantum operations based on the resonator photon-number states. As such, the cancellation of the self-Kerr nonlinearity in the resonator via the Hamiltonian engineering above help enhance the fidelity of the quantum operations.

Figure 4:
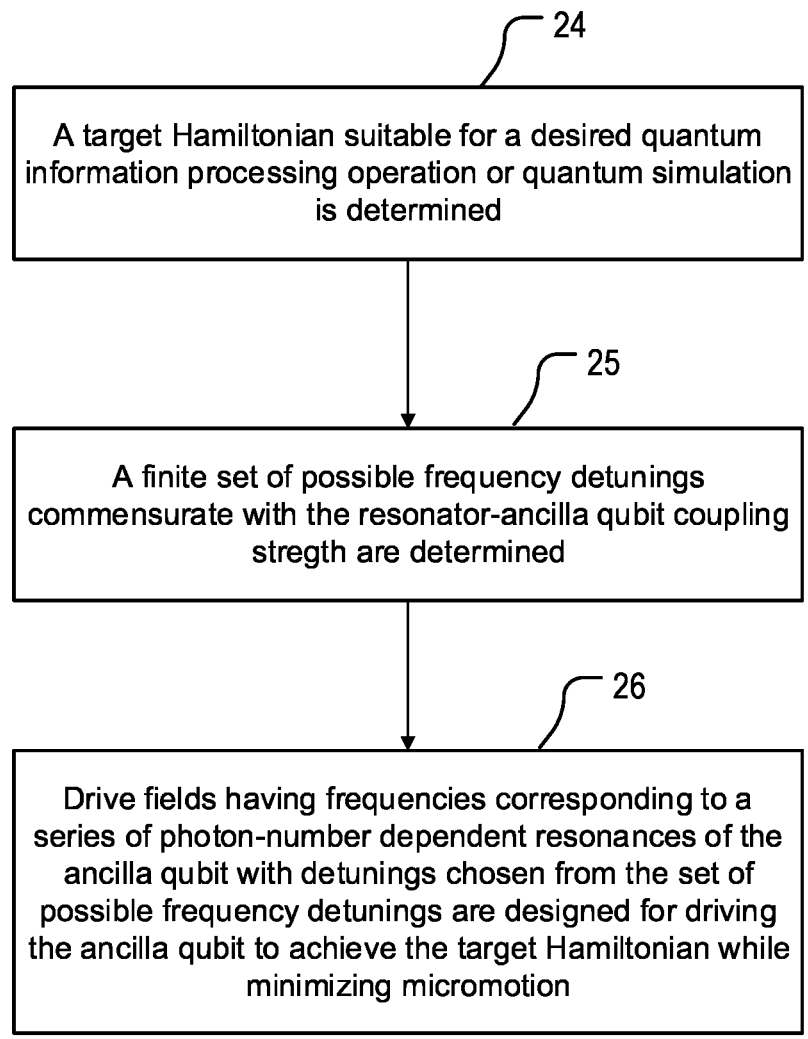
FIG. 4 illustrates example logic flow for generating a photon-number dependent target Hamiltonians in a cavity system.

The Hamiltonian engineering by adjusting the field parameters of the drive fields may be implemented in various manners. An example for determining field parameters of drive fields is shown in FIG. 4. In step 24, a target Hamiltonian due to coupling to the driven ancilla qubit and suitable for a desired quantum information processing operation or a desired quantum simulation may be determined. The target Hamiltonian may be a predetermined function of the photon-number states of the resonator.

In step 25, a finite set of possible frequency detunings for driving each of the series of transitions of the ancilla qubit coupled to the resonators at $\omega_{q,n}=\omega_q-\chi n$ may be determined. For example, a set of possible frequency detunings may include $\{\pm\chi/2, \pm\chi/4\}$. The set of possible frequency detunings may include, for another example, $\{\pm\chi/2\}$. Another set of detunings that commensurate with $\chi$ may be chosen such that an overall micromotion vanishes periodically, as described in further detail below.

In step 26, choices of frequency detunings from the set of possible frequency detunings are assigned to each frequency component $\omega_{q,n}=\omega_q-\chi n$ of the drive fields and the field magnitudes are adjusted such that the target Hamiltonian is generated while a summation of the average ancilla qubit excited state population due to micromotion is minimized. Such an optimization process may also minimize the decoherence induced by ancilla qubit relaxation.

The optimization procedure described in FIG. 4 is merely illustrative. Other optimization procedures for obtaining the target Hamiltonian may be used with a general goal of minimizing the micromotion.

The implementations above may be generalized to coupled resonator-ancilla qubit system such as the example illustrated in FIG. 3 and other systems involving more than two coupled resonators and corresponding ancilla qubits. Specifically, a target Hamiltonian as a result of driving the ancilla qubits by the external drive fields that is dependent on photon-numbers in two or more resonators maybe be achieved while minimizing the average ancilla qubit excited state populations due to micromotion. An example implementation is provided below in more detail.

While the description above and details provided below use microwave resonator(s) coupled with transmon(s) as examples, the underlying principles are applicable to other types of resonators and ancilla qubits operating in the microwave spectral range, and other resonators and ancilla qubits operating in other electromagnetic spectral range, e.g., optical range.

The various sections below further provide more detailed implementations of the principles described above.

Dispersive Model with Off-Resonant Drives for Hamiltonian Engineering

The engineering of the Hamiltonian may be achieved in a single resonator dispersively coupled with an ancilla qubit. Using a dispersive model, the qubit-cavity system of FIG. 1 and FIG. 2 without external electromagnetic driving fields may be described by the Hamiltonian $$\hat{H}_0 = \hbar\omega_a \hat{a}^\dagger \hat{a} + \hbar\omega_q |e\rangle\langle e| - \hbar\chi \hat{a}^\dagger \hat{a}|e\rangle\langle e|, \qquad (1)$$

where $\omega_a$ is the frequency of the cavity mode $\hat{a}$, $\omega_q$ is the qubit transition frequency between qubit states |g⟩ and |e⟩, and x is the dispersive coupling strength. The effective qubit transition frequency is dependent upon the number state of the cavity, |n⟩, with resonant frequencies $\omega_{q,n}=\omega_q-\chi n$. Applying a time-dependent drive $\Omega(t)$ supplied from the electromagnetic wave sources 4 of FIG. 1 to the qubit with an interaction of the form $$\hat{V}(t) = \hbar\Omega(t)\hat{\sigma}_- + \hbar\Omega*(t)\hat{\sigma}_+, \qquad (2)$$

and operating in the number-split regime where $\chi$ is larger than the transition linewidth of both the qubit and the cavity, the qubit may be driven near selective number-dependent transition frequencies to address individual number states of the cavity. Compared to a scheme of imparting selective number-dependent arbitrary phases (SNAP) to photon Fock-states by directly exciting qubit transitions, a driving regime with large detuning to the effective number state dependent qubit transition resonance frequencies may be utilized to engineer a continuous photon-number dependent target Hamiltonian.

Specifically, the electromagnetic drive of the form $$\Omega(t) = \sum_{m\in\mathbb{Z}} \Omega_m e^{i(\omega_q-m\chi+\delta_m)t}$$

may be used to drive the qubit. Moving the total Hamiltonian $\hat{H}(t)=\hat{H}_0+\hat{V}(t)$ to an interaction picture with the unitary transformation $\hat{U}=\exp(i\hat{H}_0 t/\hbar)$, the interaction becomes $$\hat{V}_I(t) = \sum_m \sum_n \hbar\Omega_m \left(e^{i((n-m)\chi+\delta_m)t}|n\rangle\langle n|\hat{\sigma}_- + H.c.\right). \quad (3)$$

Assuming $\forall m$, $|\Omega_m| \ll |\delta_m|$, a time-dependent perturbation theory may be used to derive an effective Hamiltonian, $$\hat{H}_{I,\textit{eff}} = -\sum_m \sum_n \frac{\hbar|\Omega_m|^2 |n\rangle\langle n|\hat{\sigma}_z}{(n-m)\chi+\delta_m} + O(\hat{V}^4), \quad (4)$$

which governs the long time dynamics of the cavity-qubit system up to the initial and final kicks, as described in further detail below. Since the qubit is only driven off-resonantly with $\forall m$, $|\Omega_m| \ll |\delta_m|$, $|\chi-\delta_m|$, it can be assumed that it stays in its ground state. Moving back to the original frame, the effective Hamiltonian seen by the photon while the qubit stays in its ground state is $$\hat{H}_{\textit{eff},g} = \hbar\omega_a \hat{a}^\dagger \hat{a} + \langle g|\hat{H}_{I,\textit{eff}}|g\rangle = \hbar\omega_a \hat{a}^\dagger \hat{a} + \hat{H}_E. \quad (5)$$

The off-resonant control drives on the ancilla qubit thus effectively generate a photon number dependent Hamiltonian $\hat{H}_E = \sum_n \hbar E_n |n\rangle\langle n|$ for the cavity.

Rapidly-oscillating micromotion may be dictated by the kick operator further described below. The leading order kick operator is $$\hat{G}_I^{(1)}(t) = \sum_n \sum_m \frac{\Omega_m |n\rangle\langle n|(\hat{\sigma}_- e^{i((n-m)\chi+\delta_m)t} - H.c.)}{i((n-m)\chi+\delta_m)}. \quad (6)$$

To the first order in $\hat{V}$, an initial state $|n, g\rangle$ under the kick operator above may evolve to $$|n, g\rangle + \sum_m \frac{\Omega_m |n\rangle\langle n|}{(n-m)\chi+\delta_m}\left(e^{-i((n-m)\chi+\delta_m)t} - 1\right)|n, e\rangle$$

at time t, showing an oscillating small population of the qubit excited state component $|n, e\rangle$ with a time-averaged probability where $$p_{n,e} = \sum_m \left|\frac{\Omega_m}{(n-m)\chi+\delta_m}\right|^2 + \left|\sum_m \frac{\Omega_m}{(n-m)\chi+\delta_m}\right|^2,$$

the second term include a contribution from the initial kick at t=0. This excited state component can be viewed as coherent oscillations assuming a closed qubit-cavity system. If detunings commensurate with the dispersive coupling strength $\chi$ is chosen for the driving electromagnetic fields, the overall micromotion vanishes at a period $T_M = 2\pi/\text{GCD}(\{\delta_m\text{'s}, \chi\})$, where $\text{GCD}(\{\delta_m\text{'s}, \chi\})$ denotes the greatest common divisor among all the detunings and the dispersive shift, and averages to zero at long-time. For quantum gates implemented by PND Hamiltonian, the electromagnetic drive may be designed such that $T_G = cT_M$ for some $c \in \mathbb{N}$ in order to achieve maximum gate fidelity. Alternatively, this constraint on $T_G$ may be relaxed by smoothly turning on and off the drive to remove the effect of the initial and the final kicks assuming that the drive is abruptly turned on at t=0. Alternative situation where the drive is smoothly ramped up is described in more detail below.

PND Hamiltonian Engineering

A desired PND Hamiltonian may be chosen as an target and an electromagnetic drive may be designed to generate the interactions that achieves the target Hamiltonian. For example, given a target Hamiltonian of the form $$\hat{H}_T = \sum_n \hbar E_{T,n}|n\rangle\langle n|, \quad (7)$$

appropriate values of $\Omega_m$ and $\delta_m$ may be identified such that $\hat{H}_E = \hat{H}_T$. The solution for $\Omega_m$ and $\delta_m$ for a given target Hamiltonian (with reasonable strengths $E_{T,n} \ll \chi$) may not unique and may be identified in various manners.

In some example implementations, various steps in FIG. 4 may be followed for determining the values of $\Omega_m$ and $\delta_m$ for the electromagnetic drive to achieve the target Hamiltonian with minimal excitation of the ancilla qubit excited state. In the first step (labeled as step 25) of FIG. 4, a finite set of possible detunings, e.g., $\delta_m\text{'s}=\{\pm\chi/2, \pm\chi/4\}$, may be considered and the detunings of the various frequency component of the electromagnetic drive may be selected from this set of possible detunings. By selecting detunings commensurate with $\chi$, surprising near-resonant higher-order contributions to the ancilla qubit excited state population may be minimized, and it would also become easier to determine the periodicity at which the micromotion vanishes, e.g., $T_M = 8\pi/\chi$, for the chosen set of $\delta_m\text{'s}=\{\pm\chi/2, \pm\chi/4\}$ (or alternatively, $T_M = 4\pi/\chi$ if $\delta_m\text{'s}=\{\pm\chi/2\}$ is chosen as the set of possible detunings). Those detunings are comparable to $\chi$ which allows the largest possible engineered Hamiltonian strength.

In the second step (labeled as step 26) of FIG. 4, random choices of drive detunings from the possible set of detunings $\delta_m$'s for each number state may be made, and optimized parameters (e.g., field magnitude of various frequency components of the electromagnetic drive) that generate the target Hamiltonian may be determined according to Eq. (4) plus additional fourth-order perturbation theory terms while minimizing $\sum_n p_{n,e}$, the summation of the average qubit excited state probability due to micromotion. As described in further detail below, the optimized choice of detunings also minimizes the decoherence induced by ancilla qubit relaxation.

Figure 5:
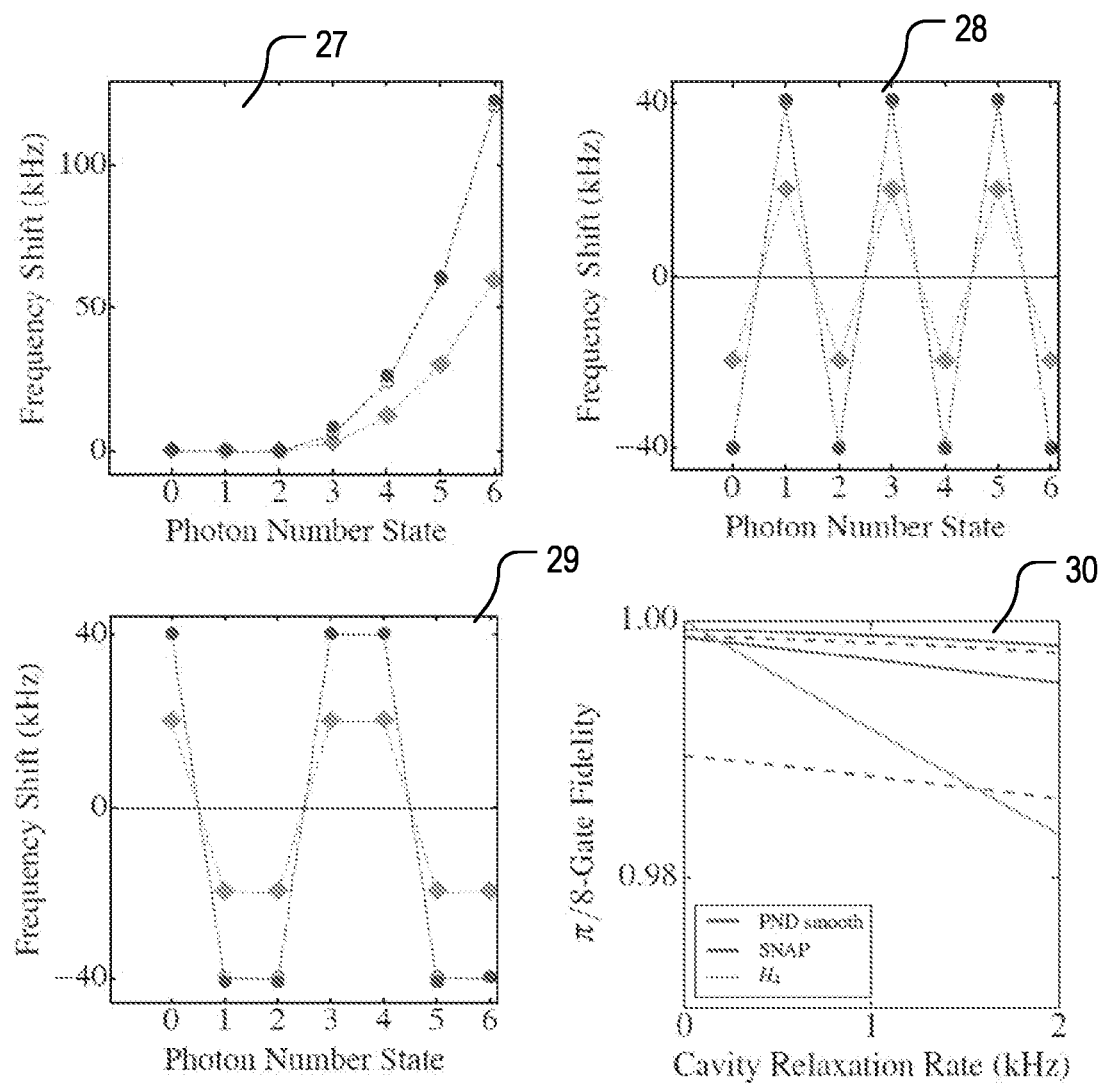
FIG. 5 illustrates example simulated energy shift as a result of engineering photon-number dependent Hamiltonians in a cavity system.

Generation of several example PND target Hamiltonians are provided below with numerical simulation results shown in FIG. 5. As shown in FIG. 5, a dispersive shift $\chi=2.56$ MHz may be assumed as an example. The Hamiltonian strengths may be engineered up to $E_T/2\pi \sim 50$ kHz with high precision. Even larger strengths $E_T/2\pi \sim 150$ kHz may be achievable even though they are subject to imperfections due to sixth- and higher-order terms in the perturbation theory. This energy scale of the engineered Hamiltonian, $E_T/2\pi \sim 50$ kHz (150 kHz), is much larger than typical cavity decoherence and thus may be favorable to achieve high fidelity quantum gates or to perform quantum simulation.

(i) Example Target Hamiltonian: Photon-Photon Interaction

In one example application for implementing a PND Hamiltonian engineering, a tunable photon-photon nonlinear interaction may be generated to emulate dynamics of quantum many-body systems with cavity photons. Such nonlinearities are typically weak in native interactions. For example, a purely three-photon interaction for cavity photons may be engineered by setting $$\hat{H}_T = \hat{H}_3 = \sum_n \hbar K_3 n(n-1)(n-2)|n\rangle\langle n|. \quad (8)$$

A simulation of the PND Hamiltonian engineering frequency for the three-photon interaction above is shown in 27 of FIG. 5, with the target Hamiltonian shown in dotted line with open markers and the engineered Hamiltonian shown by solid markers. Markers of different shape represent different engineered Hamiltonian strengths.

(ii) Example Target Hamiltonian: Parity-Dependent Energy

In another example implementation, a photon-number parity dependent Hamiltonian may be generated. Photon-number parity, for example, may serve as an error-syndrome in various bosonic quantum error correction codes such as cat codes and binomial codes. By engineering a Hamiltonian of the form $$\hat{H}_T = \hat{H}_P = \sum_n \hbar P(-1)^{n+1}|n\rangle\langle n|, \quad (9)$$

the cavity can distinguish photon-number parity by energy, which may allow for a design of error-detection code or dynamical stabilization of the code states for bosonic quantum error correction.

A simulation of the energy of the photon-number parity dependent Hamiltonian above is shown in 28 of FIG. 5, with the target Hamiltonian shown in dotted line with open markers and the engineered Hamiltonian shown by solid markers. Markers of different shape represent different engineered Hamiltonian strengths.

(iii) Example Target Hamiltonian: Error-Transparent Z-Rotation

In a resonantor, continuous rotation of an encoded logical qubit around the Z-axis may generate the whole family of phase shift gates $R_\theta$, including $$\frac{\pi}{8} - \text{gate}$$

and Z-gate, which are common elements of single-qubit gates for universal quantum computing. For quantum information encoded in rotational-symmetric bosonic code that can correct up to $d_n-1$ photon loss errors, the logical states may include $$|0_{d_n}\rangle_L \equiv \sum_{k=0}^{\infty} f_{2kd_n}|n = 2kd_n\rangle, \quad (10)$$

$$|1_{d_n}\rangle_L \equiv \sum_{k=0}^{\infty} f_{(2k+1)d_n}|n = (2k+1)d_n\rangle, \quad (11)$$

with code-dependent coefficients $f_n$'s. Phase shift gates at an angle θ for logical states can be implemented via the cavity Kerr effect $\propto(\hat{a}^\dagger\hat{a})^2$ for the Z-gate $$\theta = \frac{\pi}{2}$$

or by four-photon interaction $\propto(\hat{a}^\dagger\hat{a})^4$ for the $$\frac{\pi}{8} - \text{gate } \theta = \frac{\pi}{4}.$$

To achieve fault-tolerant quantum computation, an error-transparent Hamiltonian that commutes with and is thus uninterrupted by the photon-loss error may be designed to perform continuous logical Z-rotations. By engineering the same positive energy shift $\hbar g_R$ for $|0\rangle$, and all of its recoverable error states while engineering an equal but opposite energy shift $-\hbar g_R$ for $|1\rangle_L$, and all of its recoverable error states, the resulting Z-rotation may be 'transparent' to $d_n-1$ photon-loss-errors. Specifically, for cat codes or binomial codes with $d_n=2$, the target Hamiltonian may be of the form $$\hat{H}_Z = \sum_{k=0}^{\infty} \hbar g_R(|4k\rangle\langle 4k| + |4k+3\rangle \quad (12)$$

$$\langle 4k+3|-|4k+2\rangle\langle 4k+2|-|4k+1\rangle\langle 4k+1|).$$

For example, consider the $$\frac{\pi}{8} - \text{gate}\left(\theta = \frac{\pi}{4}\right)$$

on the kitten code $$|0\rangle_k = \frac{1}{\sqrt{2}}(|0\rangle + |4\rangle),$$

$|1\rangle_k = |2\rangle$. This rotation can be implemented by applying $\hat{H}_z$ for a time $$t = \frac{\pi}{8g_R},$$

by imparting phase $$-\frac{\pi}{8}$$

on $|n=0, 3, 4\rangle$ and phase $$+\frac{\pi}{8}$$

on $|n=1, 2\rangle$ with a SNAP gate, or by applying $H_4 = \hbar K_4 (\hat{a}^\dagger \hat{a})^4$ for a time $$t = \frac{\pi}{64 K_4}.$$

The gate performance may be characterized in the presence of photon loss by performing the rotation gate on $$\frac{1}{\sqrt{2}} (|0\rangle_k + |1\rangle_k) \otimes |g\rangle$$

gate time, followed by instantaneous single-photon-loss-error recovery in 30 of FIG. 5. Comparing the final fidelities, the PND gate and the SNAP gate show much higher resilience to photon-loss-error than $H_4$ due to their error-transparent structure.

A simulation of the energy of the error-transparent Z-rotation Hamiltonian above is shown in 29 of FIG. 5, with the target Hamiltonian shown in dotted line with open markers and the engineered Hamiltonian shown by solid markers. Markers of different shape represent different engineered Hamiltonian strengths.

Ancilla Qubit-Induced Decoherence

In practice, the decoherence of the qubit may induce cavity dephasing during the PND process. Specifically, the qubit relaxation jump operator $\hat{\sigma}_-$ at a rate $\Gamma_q \ll \chi$ may cause dephasing for off-diagonal density matrix elements of the cavity number states $\rho n_1 n_2$ at a rate $\gamma_{n_1 n_2} = \Gamma_q/2 (p_{n_1,e} + p_{n_2,e})$, while the qubit dephasing jump operator $|e\rangle\langle e|$ at a rate $\Gamma_\phi \ll \chi$ causes cavity dephasing at a rate $\gamma_{n_1 n_2} = (\Gamma_\phi/2)\{p_{n_1,e} + p_{n_2,e} - 2\Sigma_{m_1} \Omega^*_{m_1}/[(n_1-m_1)\chi + \delta m_1] \Sigma_{m_2} \Omega_{m_2}/[(n_2-m_2)\chi + \delta_{m_2}]\}$. A choice of the optimized parameters for minimizing the micromotion also minimizes the decoherence induced by qubit relaxation, which is the dominant source of imperfection in typical cQED devices with a kHz-order $\Gamma_q$.

Figure 8:
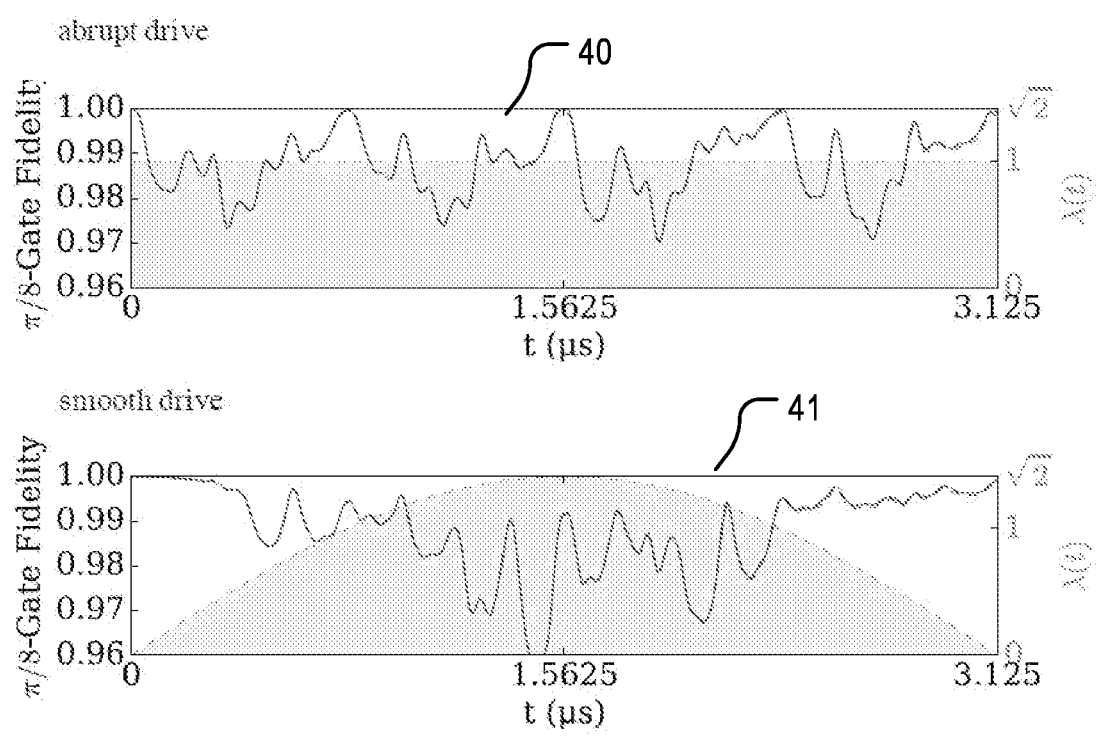
FIG. 8 illustrates example fidelity between states evolved by photon number dependent drive and states evolved by a target Hamiltonian as a function of time with or without ancilla qubit relaxation during a $\pi/8$-gate operation by abruptly turning on a photon number dependent drive with $\lambda_{abrupt}(t)=1$ and smoothly turning on and off the PND drive with $\lambda_{gate}(t)=\sqrt{2}\sin(\pi t/T_G)$, the drive ramping function being shown in dashed line.

Smoothly turning on the PND drive may remove the contribution to $p_{n,e}$ from the initial kick and further reduce the cavity dephasing. In FIG. 8, the $\pi/8$-gate operation via the abrupt PND drive and the smooth PND drive is compared. At the end of the gate operation, the simulated final gate fidelity is 99.929% for the abrupt drive and 99.934% for the smooth drive. The additional infidelity induced by ancilla relaxation is 0.075% for the abrupt drive and 0.055% for the smooth drive, showing a reduction in the qubit-induced cavity dephasing by using smooth ramping.

Figure 9:
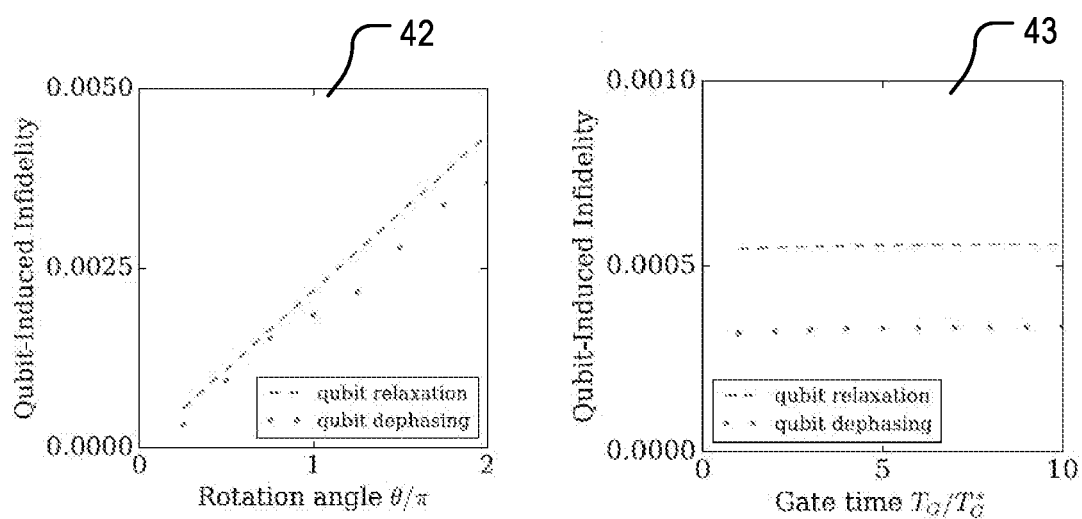
FIG. 9 illustrates example qubit-induced infidility of the photon-number dependent rotation gate as a function of rotation angle with fixed photon number dependent drive parameters $\chi_0$, $\{\Omega_0\}$, $\{\delta_0\}$ and with a $\theta$-dependent gate time $T_G=(4\theta/\pi)T^*_G$; as a function of the gate time $T_G$, with fixed parameters $\theta=\pi/4$, $\chi_0$, $\{\delta_0\}$, and with $T_G$-dependent drive amplitudes $\{\Omega\}=\{\Omega_0\sqrt{T^*_G/T_G}\}$, assuming that $\Gamma_q/2\pi=\Gamma_\phi/2\pi=3$ kHz, and $T^*_G=16\pi/\chi=3.125$ μs, that the initial state is $(1/\sqrt{2})(|0\rangle_k+|1\rangle_k)\otimes|g\rangle$, and a smooth ramping function $\lambda_{gate}(t)=\sqrt{2}\sin(\pi t/T_G)$ for the drive is applied.

In contrast to the resonantly-driven SNAP gate which has an averaged qubit excited-state probability ½ during the operation, our scheme has a suppressed qubit excitation and thus has a much smaller decoherence rate during the operation. At the end of the gate operation, the overall qubit-induced decoherence for the PND gate scales as $\Gamma_q \Omega_n^2 T_G/2\chi^2 \approx |\phi_n| \Gamma_q/2\chi$, where $\phi_n$ is the phase imparted on the number state $|n\rangle$, while the qubit-induced overall decoherence for the SNAP gate scales as $\Gamma_q T_G/2 = \pi \Gamma_q/\Omega$ regardless of the phase (limited by $|\Omega| \ll \chi$). In FIG. 9, the qubit-induced infidelity for $R_\theta$ gate implemented by smooth PND drive is studied. The qubit-induced gate infidelity is proportional to the rotation angle $\theta$ (and thus the total phase) while relatively independent of the gate time while $\theta$ is fixed, as predicted.

The SNAP and PND schemes complement each other for photon-number-dependent operations. The SNAP gate is ideal for one-shot operation to impart large phases. On the other hand, the PND Hamiltonian engineering scheme is better suited for quantum simulation, continuous operation, and quantum gate with small phases. In 30 of FIG. 5, the $\pi/8$-gate fidelity modified by a lossy qubit in dashed lines is shown. The off-resonantly driven PND gate accumulates much less decoherence (qubit-induced infidelity=0.055%) than the SNAP gate (qubit-induced infidelity=0.91%), assuming no cavity relaxation. Since the qubit-induced decoherence for the PND gate is proportional to the imparted phase, the maximal qubit-induced PND $R_\theta$ gate infidelity is 0.44% for $\theta=2\pi$, which suggests that the PND scheme shall outperform the SNAP scheme (with the given gate time) for arbitrary error-transparent $R_\theta$ gate.

PND Hamiltonian Engineering with Kerr

The description and implementations above are based on a dispersive model of the qubit-cavity coupling. In reality, the underlying microscopic model of coupled qubit-cavity system may also include higher-order coupling terms. For example, for a generalized model with photon self-Kerr K and second-order dispersive shift $\chi'$, the Hamiltonian may be represented in the form of $$\hat{H}_0 = \hbar \omega_a \hat{a}^\dagger \hat{a} + \hbar \omega_q |e\rangle\langle e| - \hbar \chi \hat{a}^\dagger \hat{a} |e\rangle\langle e| - \frac{\hbar K}{2} \hat{a}^\dagger \hat{a}^\dagger \hat{a} \hat{a} + \frac{\hbar \chi'}{2} \hat{a}^\dagger \hat{a}^\dagger \hat{a} \hat{a} |e\rangle\langle e|. \quad (13)$$

Adding control electromagnetic drives $$\Omega(t) = \sum_m \Omega_m e^{i(\omega_q - m\chi + \delta_m)}$$

and assuming $\forall m$, $|\Omega_m| \ll |\delta_m|$, the time-dependent perturbation theory can again be used to determine an effective Hamiltonian similar to eq. (4) but with every $n\chi$ replaced by $n\chi - \chi' n(n-1)/2$ due to the second-order dispersive shift.

The effective Hamiltonian seen by the photon while the qubit stays in its ground state is $$H_{eff,g} = \hbar \omega_a \hat{a}^\dagger \hat{a} - \frac{\hbar K}{2} \hat{a}^\dagger \hat{a}^\dagger \hat{a} \hat{a} + \langle g | H_{I,eff} | g \rangle. \quad (14)$$

Figure 6:
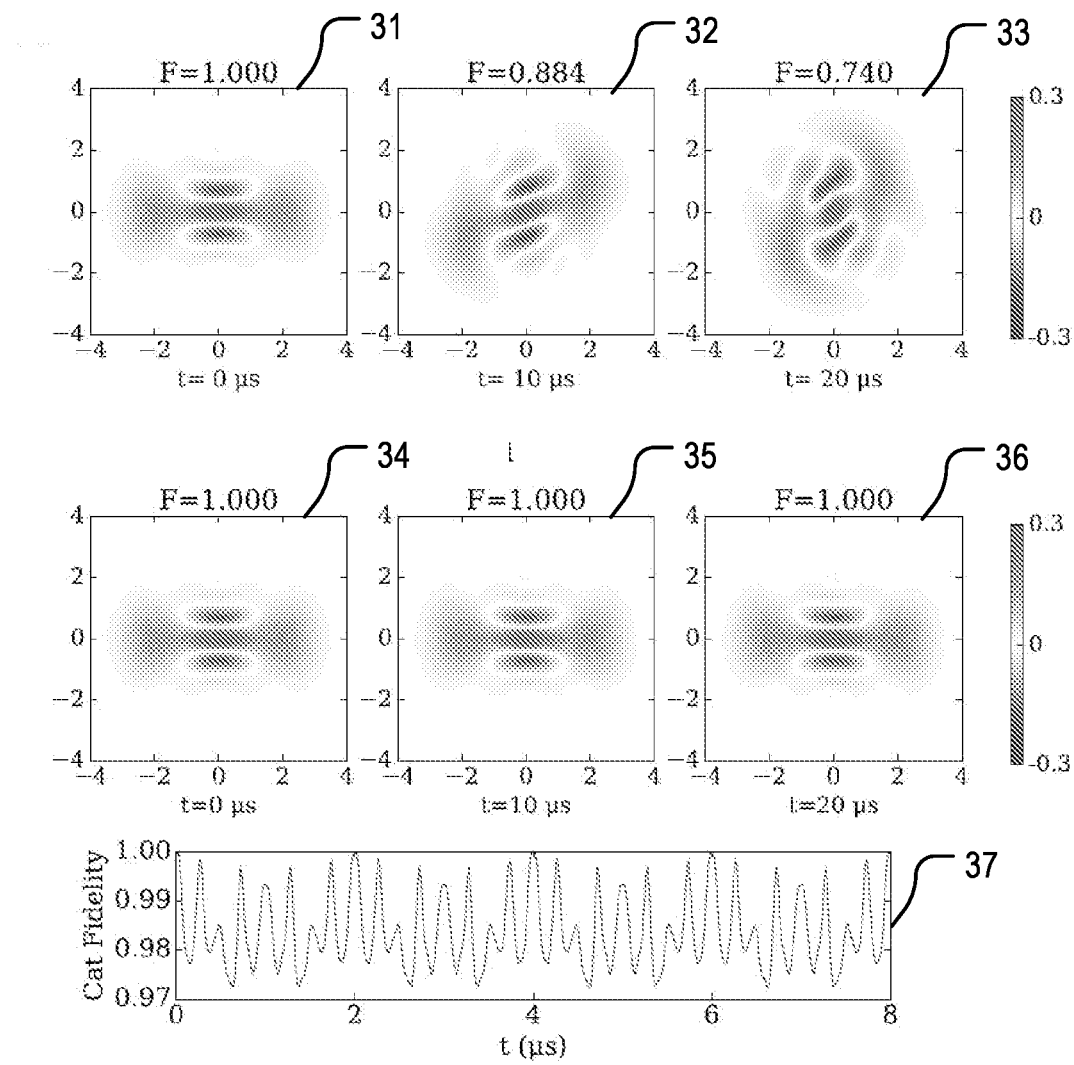
FIG. 6 illustrates simulated evolution of an example cat state of a cavity as a superposition of coherent states with opposite phases.

The self-Kerr effect may be the leading order correction to cavity resonators that can cause unwanted rotations and (in the presence of photon loss can) introduce extra decoherence. The Hamiltonian engineering scheme described above may be implemented to cancel the cavity self-Kerr by choosing $$\sum_n \hbar E_{T,n} |n\rangle\langle n| = \frac{\hbar K}{2} \hat{a}^\dagger \hat{a}^\dagger \hat{a} \hat{a},$$

or to engineer a target Hamiltonian while canceling Kerr. Numerical simulation of the benefit of PND Kerr cancellation is presented in FIG. 6. Specifically, 31-36 of FIG. 6 show simulated evolution of the cavity cat state $$\frac{1}{\sqrt{2}} (|\alpha_c\rangle + |-\alpha_c\rangle)$$

which represents an even superposition of coherent states with opposite phases. In particular, 31-33 of FIG. 6 shows simulated Wigner function snapshots of the cat state evolving under the cavity self-Kerr nonlinearity with different fidelity F, whereas 34-36 of FIG. 6 shows simulated Wigner function snapshots of the cat state with PND Kerr cancellation implemented as describe above corresponding to 31-33 of FIG. 6. Further, 37 of FIG. 6 further shows cat state fidelity as a function of time under PND Kerr cancellation and a signature of the micromotion. In the simulations above, it is assumed that $\alpha_c=\sqrt{2}$, cutoff photon-number $N_{cut}=6$, $\chi/2\pi=2$ MHZ, $K/2\pi=3$ kHz, $\chi'/2\pi=6$ kHz, $T_M=2$ μs, and there is no photon loss. The cat state can be preserved with close to unit fidelity for t=20 μs and 99.2% fidelity for t=100 μs with PND Kerr cancellation, as shown in 37 of FIG. 6.

PND Hamiltonian Engineering for Coupled Cavities

The PND scheme may be further generalized to the case of coupled cavities, an example of which is shown in FIG. 3. Specifically, two coupled cavities may be used and the two cavity modes $\hat{a}$ and $\hat{b}$ may be dispersively coupled to their own ancilla qubits $\hat{\sigma}^a$ and $\hat{\sigma}^b$, and to another joint qubit $\hat{\sigma}^c$ with a dispersive shift $\chi_c$ (assumed to be equal for both cavity modes), yielding a Hamiltonian (without an external electromagnetic drive) in the form of $$\hat{H}_0 = \hbar\omega_a \hat{a}^\dagger \hat{a} + \hbar\omega_{q,a}|e_a\rangle\langle e_a| - \hbar\chi_a \hat{a}^\dagger \hat{a}|e_a\rangle\langle e_a| + \hbar\omega_b \hat{b}^\dagger \hat{b} + \hbar\omega_{q,b}|e_b\rangle \quad (15)$$
$$\langle e_b| - \hbar\chi_b \hat{b}^\dagger \hat{b}|e_b\rangle\langle e_b| + \hbar\omega_{q,c}|e_c\rangle\langle e_c| - \hbar\chi_c(\hat{a}^\dagger \hat{a} + \hat{b}^\dagger \hat{b})|e_c\rangle\langle e_c|$$

where $\omega_{a/b}$ are the frequencies of the cavities, $\omega_{q,a/b/c}$ are the qubit transition frequencies between $|g_{a/b/c}\rangle$ and $|e_{a/b/c}\rangle$, and $\chi_{a/b/c}$ are the dispersive coupling strengths. The coupled qubit can be driven to control cavity states dependent on $n_a+n_b$. The qubits associated with the two cavities $\hat{\sigma}^a$ and $\hat{\sigma}^b$ may likewise be driven to control cavity states dependent on $n_a$ and no, respectively. Altogether, a two-cavity Hamiltonian $\hat{H}_E = \Sigma_{n_a,n_b} \hbar E_{n_a n_b}|n_a n_b\rangle\langle n_a n_b| = \Sigma_{n_a,n_b} \hbar(E_{c,n_a+n_b} + E_{a,n_a} + E_{b,n_b})|n_a n_b\rangle\langle n_a n_b|$ may be engineered.

The generalized PND scheme described above may be applied to implement controlled-Z-rotations for realizing controlled-phase gates CPHASE(θ), which are one class of essential two-qubit entangling gates for universal quantum computing. Using the PND scheme, an error-transparent operation of controlled-Z-rotation which is tolerant against photon loss in the cavities may be implemented.

For example, an error-transparent Hamiltonian $\hat{H}_{cR}$ for CPHASE(θ) may be designed such that within a total number distance $d_n = \min(d_{n_a}, d_{n_b})$, $|1_a 1_b\rangle_L$ and its error states have the same negative energy shift $\hbar g_{cR}$, $$\hat{H}_{cR} = -\hbar g_{cR} \sum_{k=0}^{\infty} \sum_{l_a=0}^{d_n-1} |(2k+1)d_{n_a} - l_a\rangle \quad (16)$$
$$\langle (2k+1)d_{n_a} - l_a|_a \otimes \sum_{l_b=0}^{d_n-1-l_a} |(2k+1)d_{n_b} - l_b\rangle\langle (2k+1)d_{n_b} - l_b|_b,$$

up to residual energy shifts on error states with total photon loss number exceeding $d_n-1$.

Figure 7:
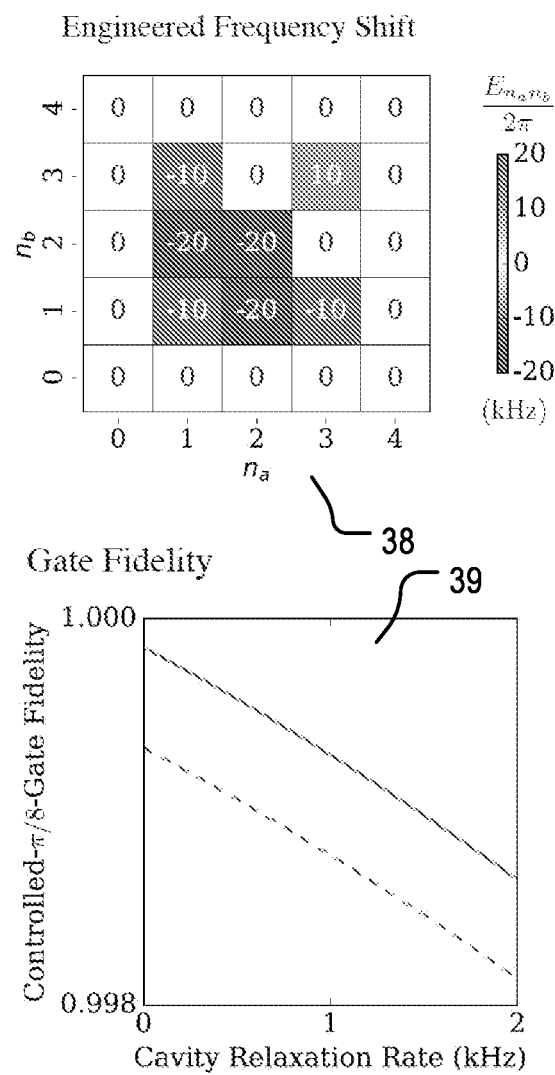
FIG. 7 illustrates simulated engineered energy shifts for error-transparent controlled-rotation in a cavity as a function of photon numbers in coupled cavities and a fidelity of a photon-number controlled $\pi/8$-gate as a function of a total cavity relaxation rate.

FIG. 7 shows simulated engineered energy shift for error-transparent controlled-rotation as a function of the photon-numbers of coupled cavities. For example, the targeted energy shifts to implement $\hat{H}_{cR}$ for $d_n=d_{n_a}=d_{n_b}=2$ and the numerically simulated engineered energy shifts by the generalized PND as a function of the photon-numbers of coupled cavities $n_a$ and $n_b$ are shown in 38 of FIG. 7. The simulated fidelity of a PND controlled-π/8-gate as a function of the total cavity relaxation rate is shown in 39 of FIG. 7. The simulated fidelity in 39 of FIG. 7 starting from the kitten-code encoded state $$\frac{1}{2}(|0_a\rangle_k + |1_a\rangle_k) \otimes (|0_b\rangle_k + |1_b\rangle_k) \otimes |g_a g_b g_c\rangle,$$

followed by instantaneous single-photon-loss recovery in both cavities, is larger than 99.8% even in the presence of the relaxation of all three ancilla qubits. In 39 of FIG. 7, the dashed line represents the modifications due to ancilla qubit relaxation at a rate $\Gamma_{qa}/2\pi=\Gamma_{qb}/2\pi=\Gamma_{qc}/2\pi=3$ kHz. It is assumed above that $\chi_a/2\pi=\chi_b/2\pi=\chi_c/2\pi=2.56$ MHz, the controlled-π/8-gate time $T_G=16\pi/\chi=2T_M$, and that the two cavities have the same relaxation rate.

More Details for the Dispersive Model
(i) Unitary Evaluation

A perturbative expansion of the unitary evolution for an off-resonantly driven, dispersively coupled qubit-oscillator system may be described by the Hamiltonian $$\hat{H}(t) = \hbar\omega_a \hat{a}^\dagger \hat{a} + \hbar\omega_q|e\rangle\langle e| - \hbar\chi \hat{a}^\dagger \hat{a}|e\rangle \quad (17)$$
$$\langle e| + \hbar\Omega(t)\hat{\sigma}_- + \hbar\Omega^*(t)\hat{\sigma}_+ \equiv \hat{H}_0 + \hat{V}(t),$$

where $\hat{V}(t) = \hbar\Omega(t)\hat{\sigma}_- + \hbar\Omega^*(t)\hat{\sigma}_+$ with $$\Omega(t) = \sum_m \Omega_m e^{i(\omega_q - m\chi + \delta_m)t}.$$

It may be assumed that a tri-partition ansatz for the evolution operator $\hat{U}_s(t_f, t_i)$ such that $|\psi(t_f)\rangle \equiv \hat{U}_s(t_f, t_i)|\psi(t_i)\rangle$ for an initial state $|\psi(t_i)\rangle$ and a final state $|\psi(t_f)\rangle$, $$\hat{U}_S(t_f, t_i) = e^{-i\hat{G}(t_f)} e^{-i\hat{H}_{eff}(t_f-t_i)/\hbar} e^{i\hat{G}(t_i)}, \quad (18)$$

where the evolution is separated into a time-independent effective Hamiltonian $\hat{H}_{eff}$ governing the long-time dynamics, as well as initial and final kicks, $\hat{G}(t_i)$ and $\hat{G}(t_f)$. The subscript S denotes evolution in the Schrödinger picture.

Move to the interaction picture with the unitary transformation $\hat{U} = \exp(i\hat{H}_0 t/\hbar)$, the interaction term is $$\hat{V}_I(t) = \hat{U}\hat{H}\hat{U}^\dagger - i\hbar\hat{U}\dot{\hat{U}}^\dagger = \sum_m \sum_n \hbar(\Omega_m e^{i((n-m)\chi+\delta_m)t}|n\rangle\langle n|\hat{\sigma}_- + H.c.). \quad (19)$$

where the subscript I denotes operators in the interaction picture, $\hat{O}_I(t) = e^{i\hat{H}_0 t/\hbar}\hat{O}(t)e^{-i\hat{H}_0 t/\hbar}$. The evolution operator in the interaction picture is connected to the schrödinger picture one by $$\hat{U}_I(t_f, t_i) = e^{i\hat{H}_0 t_f/\hbar} e^{-i\hat{G}(t_f)} e^{-i\hat{H}_{eff}(t_f-t_i)/\hbar} e^{i\hat{G}(t_i)} e^{-i\hat{H}_0 t_i/\hbar} = \quad (20)$$
$$e^{-i\hat{G}_I(t_f)} e^{-i(\hat{H}_{eff}-\hat{H}_0)(t_f-t_i)/\hbar} e^{i\hat{G}_I(t_i)}.$$

Assuming $|\Omega_m| \ll \chi, |\delta_m|$, the time-dependent perturbation theory may be used to calculate $\hat{U}_I(t_f, t_i)$ in powers of $\hat{V}_I$ and determine the perturbative expansion of $\hat{H}_{eff}$ and $\hat{G}_I(t)$ such that $\hat{H}_{eff} = \hat{H}_{eff}^{(0)} + \hat{H}_{eff}^{(1)} + \hat{H}_{eff}^{(2)} + \ldots$ and $\hat{G}_I(t) = \hat{G}_I^{(0)}(t) + \hat{G}_I^{(1)}(t) + \hat{G}_I^{(2)}(t) + \ldots$.

Specifically, $$\hat{U}_I(t_f, t_i) = \quad (21)$$

$$1 - \frac{i}{\hbar} \int_{t_i}^{t_f} \hat{V}_I(t_1) dt_1 + \left(\frac{-i}{\hbar}\right)^2 \int_{t_i}^{t_f} dt_1 \int_{t_i}^{t_1} dt_2 \hat{V}_I(t_1) \hat{V}_I(t_2) + \ldots.$$

For the zeroth order, $\hat{G}_I^{(0)}(t) = 0$ and $\hat{H}_{eff}^{(0)} = \hat{H}_0 = 0$. For $\mathcal{O}(\hat{V})$, $$-\frac{i}{\hbar} \int_{t_i}^{t_f} \hat{V}_I(t_1) dt_1 = -i\hat{G}_I^{(1)}(t_f) - \frac{i}{\hbar} \hat{H}_{eff}^{(1)}(t_f - t_i) + i\hat{G}_I^{(1)}(t_i). \quad (22)$$

It may be determined that $$-\left\langle n, g \left| \frac{i}{\hbar} \int_{t_i}^{t_f} \hat{V}_I(t_1) dt_1 \right| n, g \right\rangle = -\left\langle n, e \left| \frac{i}{\hbar} \int_{t_i}^{t_f} \hat{V}_I(t_1) dt_1 \right| n, e \right\rangle = 0, \quad (23)$$

and $$-\left\langle n, g \left| \frac{i}{\hbar} \int_{t_i}^{t_f} \hat{V}_I(t_1) dt_1 \right| n, e \right\rangle = \quad (24)$$

$$-i \sum_m \frac{\Omega_m e^{i((n-m)\chi + \delta_m)t_f} - \Omega_m e^{i((n-m)\chi + \delta_m)t_i}}{i((n-m)\chi + \delta_m)}.$$

Thus, it may be determined that $$\hat{H}_{eff}^{(1)} = 0, \quad (25)$$

$$\hat{G}_I^{(1)}(t) = \quad (26)$$

$$\sum_m \sum_n \frac{|n\rangle\langle n|}{i((n-m)\chi + \delta_m)} \left(\Omega_m \hat{\sigma}_- e^{i((n-m)\chi + \delta_m)t} - \Omega_m^* \hat{\sigma}_+ e^{-i((n-m)\chi + \delta_m)t}\right).$$

For $\mathcal{O}(\hat{V}^2)$, $$\left(\frac{-i}{\hbar}\right)^2 \int_{t_i}^{t_f} dt_1 \int_{t_i}^{t_1} dt_2 \hat{V}_I(t_1) \hat{V}_I(t_2) = -i\hat{G}_I^{(2)}(t_f) - \frac{i}{\hbar} \hat{H}_{eff}^{(2)}(t_f - t_i) + \quad (27)$$

$$i\hat{G}_I^{(2)}(t_i) + \frac{1}{2}\left(\frac{-i\hat{H}_{eff}^{(1)}(t_f - t_i)}{\hbar}\right)^2 + \frac{1}{\hbar}\hat{H}_{eff}^{(1)}(t_f - t_i)\hat{G}_I^{(1)}(t_i) -$$

$$\frac{1}{\hbar}\hat{G}_I^{(1)}(t_f)\hat{H}_{eff}^{(1)}(t_f - t_i) + \hat{G}_I^{(1)}(t_f)\hat{G}_I^{(1)}(t_i) - \frac{\hat{G}_I^{(1)}(t_i)^2}{2} - \frac{\hat{G}_I^{(1)}(t_f)^2}{2}.$$

It may be obtained that $$\hat{H}_{eff}^2 = -\sum_m \sum_n \frac{\hbar |\Omega_m|^2 |n\rangle\langle n|}{(n-m)\chi + \delta_m} \hat{\sigma}_z, \quad (28)$$

$$\hat{G}_I^{(2)}(t) = -\sum_{m_1} \sum_{m_2 \neq m_1} \sum_n \frac{\Omega_{m_1}^* \Omega_{m_2} e^{-i(\delta_{m_1} - \delta_{m_2} - (m_1 - m_2)\chi)t}}{2i((n-m_1)\chi + \delta_{m_1})} |n\rangle\langle n| \hat{\sigma}_z. \quad (29)$$

$$(\delta_{m_1} - \delta_{m_2} - (m_1 - m_2)\chi)$$

The third- and forth-order terms in the effective Hamiltonian are $$\hat{H}_{eff}^{(3)} = 0, \quad (30)$$

$$\hat{H}_{eff}^{(4)} = \sum_{m_1} \sum_{m_2} \sum_n \frac{\hbar |\Omega_{m_1}|^2 |\Omega_{m_2}|^2 |n\rangle\langle n|\hat{\sigma}_z}{((n-m_1)\chi + \delta_{m_1})((n-m_2)\chi + \delta_{m_2})^2} - \quad (31)$$

$$\sum_{m_1} \sum_{m_2 \neq m_1} \sum_n \frac{\hbar |\Omega_{m_1}|^2 |\Omega_{m_2}|^2 |n\rangle\langle n|\hat{\sigma}_z}{((n-m_1)\chi + \delta_{m_1})^2 (\delta_{m_1} - \delta_{m_2} - (m_1 - m_2)\chi)} +$$

$$\sum_{m_1, m_2, m_3, m_4} \sum_n \frac{\hbar \Omega_{m_1} \Omega_{m_2}^* \Omega_{m_3} \Omega_{m_4}^* |n\rangle\langle n|\hat{\sigma}_z}{((n-m_4)\chi + \delta_{m_4})},$$

$$(\delta_{m_1} - \delta_{m_2} - (m_1 - m_2)\chi)((n-m_1)\chi + \delta_{m_1})$$

where the last term satisfies the condition $\delta_{m_1} - m_1\chi + \delta_{m_3} - m_3\chi = \delta_{m_2} - m_2\chi + \delta_{m_4} - m_4\chi$, and $m_1 \neq m_2 \neq m_3 \neq m_4$ or $m_1 = m_3 \neq m_2 \neq m_4$ or $m_2 = m_4 \neq m_1 \neq m_3$.

Consider special cases where $\delta_m$ are commensurate with $\chi$, this problem reduces to a Floquet Hamiltonian with a single periodicity, and the Floquet effective Hamiltonian and the kick operator may be calculated to obtain identical results.

(ii) Unitary Evolution with Smooth Ramping

It has been assumed above that the drive is abruptly turned on at an initial time $t_i$ and lasts till a final time $t_f$. Alternatively, a ramping function $\lambda(t)$ such that $\hat{H}(t) = \hat{H}_0 + \lambda(t)\hat{V}(t)$ may be applied to smoothly turn on (and off) the drive, which will remove the effect associated with the initial (and the final) kick operator if the ramping time scale is much longer than $1/\chi$. The choice of the ramping function $\lambda(t)$ is not unique.

For mathematical simplicity, the case of applying a sinusoidal envelope $\lambda(t) = \sin(\gamma t)$ to a short-time gate operation from $t=0$ to $t=T_G=\pi/\gamma$ may be considered. Using the time-dependent perturbation theory, it can be found that $$-\frac{i}{\hbar} \int_0^{T_G} \sin(\gamma t_1) \hat{V}_I(t_1) dt_1 = \quad (32)$$

$$-\sum_n |n\rangle\langle n| \sum_m \left[\frac{\Omega_m e^{i((n-m)\chi + \delta_m + \gamma)t_1} \hat{\sigma}_-}{2i((n-m)\chi + \delta_m - \gamma)} - \frac{\Omega_m e^{i((n-m)\chi + \delta_m - \gamma)t_1} \hat{\sigma}_-}{2i((n-m)\chi + \delta_m - \gamma)}\right]_0^{\frac{\pi}{\gamma}} +$$

$$H.c. \xrightarrow{\chi \gg \gamma} 0,$$

and $$\left(\frac{-i}{\hbar}\right)^2 \int_0^{T_G} dt_1 \int_0^{t_1} dt_2 \sin(\gamma t_1) \hat{V}_I(t_1) \quad (33)$$

$$\sin(\gamma t_2) \hat{V}_I(t_2) \xrightarrow{\chi \gg \gamma} \sum_m \sum_n \frac{i|\Omega_m|^2 |n\rangle\langle n|}{2((n-m)\chi + \delta_m)} \hat{\sigma}_z T_G.$$

In the limit $\chi \gg \gamma$, the resulting time evolution with this smooth sinusoidal envelope is thus equivalent to having an effective Hamiltonian generated by $\hat{V}(t)/\sqrt{2}$ but without any initial or final kick effects. To compensate for the $1/\sqrt{2}$ factor, the same gate (by accumulating the same phase) may be implemented as the abrupt version $\hat{H}(t)=\hat{H}_0+\hat{V}(t)$ by rescaling the ramping function to $\lambda_{gate}(t)=\sqrt{2}\sin(\gamma t)$ or by letting the system evolve twice as long. In the abrupt version a gate time is chosen at which the micromotion vanishes, while with the sinusoidal envelope there is no such requirement because the micromotion has already been removed by the smooth ramping.

For long-time operation of the PND Hamiltonian engineering scheme, a ramp-up function $\lambda_{up}(t)=0\to 1$ and a ramp-down function $\lambda_{down}(t)=1\to 0$ may be designed at the beginning and the end of the drive. An example ramp-up and ramp-down functions may be $$\lambda_{up}(t) = \begin{cases} \lambda_s \sin[\pi(t-t_i)/2T_s] & t_i \leq t \leq t_i + T_s \\ \frac{\lambda_s - 1}{2}\sin[\pi(t-t_i)/2T_s] + \frac{\lambda_s + 1}{2} & t_i + T_s \leq t \leq t_i + 3T_s \end{cases}, \quad (34)$$

$$\lambda_{down}(t) = \begin{cases} \frac{\lambda_s - 1}{2}\sin[\pi(t_f-t)/2T_s] + \frac{\lambda_s + 1}{2} & t_f - 3T_s \leq t \leq t_f - T_s \\ \lambda_s \sin[\pi(t_f-t)/2T_s] & t_f - T_s \leq t \leq t_f \end{cases}, \quad (35)$$

and $\lambda(t)=1$ otherwise. Here $$\lambda_s = \frac{\sqrt{46}-1}{5}$$

may be implemented as a special chosen value to generate the same accumulated phase as the abrupt case during the ramp-up and ramp-down periods.

More Details of Evolution with Qubit-Induced Dephasing

In considering how errors in the ancilla qubit propagate to the cavity mode under off-resonant drives, the ancilla errors may be described by the qubit relaxation jump operator $\sqrt{\Gamma_q}\hat{\sigma}_-$ and the qubit dephasing jump operator $\sqrt{\Gamma_\phi}|e\rangle\langle e|$ in the time-dependent Lindblad master equation $$\partial_t \rho_{tot}(t) = -\frac{i}{\hbar}[H(t), \rho_{tot}(t)] + \mathcal{D}(\rho_{tot}(t)), \quad (36)$$

where $\rho_{tot}$ is the total density matrix of the coupled qubit-oscillator system, and $$\mathcal{D}(\rho(t)) = \sum_k \left[ J_k \rho(t) J_k^\dagger - \frac{1}{2} J_k^\dagger J_k \rho(t) - \rho(t) \frac{1}{2} J_k^\dagger J_k \right], \quad (37)$$

$$\{J_k\} = \{\sqrt{\Gamma_q}\hat{\sigma}_-, \sqrt{\Gamma_\phi}|e\rangle\langle e|, \sqrt{\kappa_\alpha}\hat{a}\}.$$

Here $\kappa_\alpha$ represents the relaxation rate of the cavity.

Moving to the interaction picture, $\hat{\sigma}_-$ becomes $\hat{\sigma}_{-,I}(t) = \sum_n |n\rangle\langle n|e^{-i(\omega_q - n\chi)t}\hat{\sigma}_-$ while $|e\rangle\langle e|$ stays the same. Under a rotating wave approximation, when $\Gamma_q \ll |\chi|$ such that qubit decay releases a photon-number-dependent energy $\hbar(\omega_q - n\chi)$, the relaxation jump operator may be treated as a set of independent jump operators in the cavity number state manifold, $$\partial_t \rho_{tot,I}(t) = -\frac{i}{\hbar}[V_I(t), \rho_{tot,I}(t)] + \mathcal{D}_I(\rho_{tot,I}(t)) \cdot \mathcal{D}_I(\rho(t)) = \quad (38)$$

$$\sum_k \left[ J_{k,I} \rho(t) J_{k,I}^\dagger - \frac{1}{2} J_{k,I}^\dagger J_{k,I} \rho(t) - \rho(t) \frac{1}{2} J_{k,I}^\dagger J_{k,I} \right],$$

$$\{J_{k,I}\} = \{\sqrt{\Gamma_\phi}|e\rangle\langle e|, \sqrt{\Gamma_q}\hat{\sigma}_-|n\rangle\langle n|| \forall n, \sqrt{\kappa_\alpha}\hat{a}\}. \quad (39)$$

Assuming again a tri-partition ansatz for the evolution superoperator $\Lambda_{t_f,t_i}$, $\rho_I(t_f) \equiv \Lambda_{t_f,t_i} \rho_I(t_i)$, $$\Lambda_{t_f,t_i} = e^{-\Phi_{t_f}} e^{\tilde{\mathcal{L}}(t_f - t_i)} e^{\Phi_{t_i}}, \quad (40)$$

such that there is a time-independent Liouvillian $\tilde{\mathcal{L}}$ and a kick superoperator $\Phi_t$ that absorbs the time dependence. For $\Gamma_\phi$, $\Gamma_q$, $|\Omega_m| \ll |\delta_m|$, $|\chi - \delta_m|$ and $\delta_m \sim \mathcal{O}(\chi)$, $\tilde{\mathcal{L}}$ and $\Phi_t$ may be expanded in perturbative orders of $\mathcal{O}(\Omega_m, \Gamma_\phi, \Gamma_q)$.

The time-independent evolution superoperator may then be determined as $\tilde{\mathcal{L}} \approx \tilde{\mathcal{L}}^{(1)} + \tilde{\mathcal{L}}^{(2)} + \tilde{\mathcal{L}}^{(3)}$ with $$\tilde{\mathcal{L}}^{(1)}(\cdot) = \mathcal{D}_I(\cdot), \quad (41)$$

$$\tilde{\mathcal{L}}^{(2)}(\cdot) = -\frac{i}{\hbar}[\hat{H}_{eff}^{(2)}, \cdot], \quad (42)$$

$$\tilde{\mathcal{L}}^{(3)}(\cdot) = \quad (43)$$

$$\frac{1}{2}\sum_n \sum_m \frac{1}{((n-m)\chi + \delta_m)^2}([[S_-, \mathcal{D}_I], S_+] + [[S_+, \mathcal{D}_I], S_-])(\cdot),$$

where $S_-(\cdot) = [|n\rangle\langle n|\Omega_m \hat{\sigma}_- e^{i((n-m)\chi + \delta_m)t}, \cdot]$, and $S_+(\cdot) = [|n\rangle\langle n|\Omega_m^* \hat{\sigma}_+ e^{-i((n-m)\chi + \delta_m)t}, \cdot]$, and the kick superoperator as $\Phi_t \approx \Phi_t^{(1)} + \Phi_t^{(2)}$ with $$\Phi_t^{(1)}(\cdot) = [i\hat{G}_I^{(1)}(t), \cdot], \quad (44)$$

$$\Phi_t^{(2)}(\cdot) = [i\hat{G}_I^{(2)}(t), \cdot] - \sum_n \sum_m \frac{1}{((n-m)\chi + \delta_m)^2}[S_+ + S_-, \mathcal{D}_I](\cdot). \quad (45)$$

Choosing $\delta_m$ commensurate with $\chi$ such that all the time-dependent terms have a common periodicity $T_M$, then for $t_f = t_i + cT_M$ for some integer $c$, $$\rho_I(t_i + cT_M) = e^{-\Phi_{t_i}} e^{\tilde{\mathcal{L}} cT_M} e^{\Phi_{t_i}} = e^{\mathcal{L}_F(t_i) cT_M}$$

for an Floquet generator $$\mathcal{L}_F(t_i) = e^{-\Phi_{t_i}} \tilde{\mathcal{L}} e^{\Phi_{t_i}}.$$

Taking $t_i = 0$ and tracing over the ancilla qubit degree of freedom assuming $\rho_{gg} = 1$ and $\rho_{ee} = \rho_{ge} = \rho_{eg} = 0$, then the cavity density matrix in the interaction picture $\rho_{gg} = 1$ follows a Floquet effective master equation $$\partial_t \rho_{c,I}(t) \approx -i\left[\sum_m \sum_n \frac{|\Omega_m|^2 |n\rangle\langle n|}{(n-m)\chi + \delta_m}, \rho_{c,I}(t)\right] + \mathcal{D}_{c,I}(\rho_{c,I}(t)), \quad (46)$$

with jump operators $$\{J_{c,k,I}\} = \left\{\frac{\sqrt{\Gamma_\phi}\,\Omega_m^*|n\rangle\langle n|}{(n-m)\chi+\delta_m}, \frac{\sqrt{\Gamma_q}\,\Omega_m^*|n\rangle\langle n|}{(n-m)\chi+\delta_m}\bigg|\forall\, n,m\right\} \cup \tag{47}$$

$$\left\{\sum_n\sum_m\frac{\sqrt{\Gamma_\phi}\,\Omega_m^*|n\rangle\langle n|}{(n-m)\chi+\delta_m}\right\} \cup \left\{\sum_m\frac{\sqrt{\Gamma_q}\,\Omega_m^*|n\rangle\langle n|}{(n-m)\chi+\delta_m}\bigg|\forall\, n\right\}.$$

The jump operators cause dephasing for off-diagonal density matrix elements of the cavity number states $\rho_{n_1 n_2}$ at a rate $$\gamma_{n_1 n_2} = \tag{48}$$

$$\frac{\Gamma_\phi+\Gamma_q}{2}(p_{n_1,e}+p_{n_2,e}) - \Gamma_\phi \sum_{m_1}\frac{\Omega_{m1}^*}{(n_1-m_1)\chi+\delta_{m_1}}\sum_{m_2}\frac{\Omega_{m_2}}{(n_2-m_2)\chi+\delta_{m_2}},$$

where $$p_{n,e} \equiv \sum_m\left|\frac{\Omega_m}{(n-m)\chi+\delta_m}\right|^2 + \left|\sum_m\frac{\Omega_m}{(n-m)\chi+\delta_m}\right|^2$$

is the time-averaged probability of the qubit excited state component $|n, e\rangle$ due to $\hat{G}_I^{(1)}(t)$. The second term in $p_{n,e}$, $$\left|\sum_m\frac{\Omega_m}{(n-m)\chi+\delta_m}\right|^2,$$

is the contribution from the initial kick. Smoothly ramping up the drive can thus reduce the qubit-induced dephasing by removing the effect of the kick.

(iii) Optimized PND Parameters and Additional Simulations

In some implementations, optimized PND Hamiltonian engineering parameters that minimizes $\Sigma_n p_{n,e}$ may be determined. All the engineered frequency shifts may be subject to a Fourier transformation precision of, e.g., ±0.5 kHz. The optimized parameters with real $\Omega_m$'s may be obtained. The condition requiring real $\Omega_m$'s may be relaxed and complex values of $\Omega_m$'s may be solved, which may give rise to similar performance.

Additional simulations of fidelity for PND error-transparent Z-rotation is shown in FIG. 8 and FIG. 9. In 40 and 41 of FIG. 8, the π/8-gate operation via abruptly turning on the PND drive with λ(t)=1 versus smoothly turning on and off the PND drive with $\lambda_{gate}(t)=\sqrt{2}\sin(\pi t/T_G)$ are compared, showing that the smooth ramping scheme reduces the qubit-induced dephasing. More specifically in FIG. 8, the simulated fidelity between the states evolved by the PND drive and the states evolved by the target Hamiltonian $H_Z$ as a function of time is shown in solid curve (without ancilla qubit relaxation) and dashed curve overlayed by the solid curve (with ancilla qubit relaxation). The ramping function λ(t) in presented as the filled orange curve in FIG. 8. The parameters in table 5. is used and it is assumed that $\Gamma_q/2\pi=3$ kHz and $T_G=16\pi/\chi=3.125$ µs. The initial state is $$\frac{1}{\sqrt{2}}(|0\rangle_k + |1\rangle_k)\otimes|g\rangle.$$

At the end of the gate operation, the final gate fidelity is 99.929% for the abrupt drive and 99.934% for the smooth drive. The additional infidelity induced by ancilla relaxation is 0.075% for the abrupt drive and 0.055% for the smooth drive.

In FIG. 9, the qubit-induced infidelity for the PDN $R_\theta$ gate implemented by smooth PND drives is shown as being proportional to the rotation angle θ (and thus the total phase) while relatively independent of the gate time while θ is fixed, as predicted (values of the $R_\theta$ gate infidelity with qubit relaxation or dephasing subtracted by the gate infidelity without qubit relaxation or dephasing). More specifically, 42 of FIG. 9 shows qubit-induced infidelity as a function of the rotation angle θ, with fixed PND drive parameters $\chi_0$, $\{\Omega_0\}$, $\{\delta_0\}$ and with a θ-dependent gate time $T_G=(4\theta/\pi)T^*_G$. In 42 of FIG. 9, qubit-induced infidelity as a function of the gate time $T_G$, with fixed parameters θ=π/4, $\chi_0$, $\{\delta_0\}$, and with $T_G$-dependent drive amplitudes $\{\Omega\}=\{\Omega_0\sqrt{T^*_G/T_G}\}$ is shown. Here $\chi_0$, $\{\Omega_0\}$, and $\{\delta_0\}$ are the parameters used in table 5. It is assumed that $\Gamma_q/2\pi=\Gamma_\phi/2\pi=3$ kHz, and $T^*_G=16\pi/\chi=3.125$ µs. The initial state is $$\frac{1}{\sqrt{2}}(|0\rangle_k + |1\rangle_k)\otimes|g\rangle,$$

and a smooth ramping function $\lambda(t)=\sqrt{2}\sin(\pi t/T_G)$ is used for the drive.

The various tables below contain data used to generate the FIG. 5.

TABLE 1

Three-Photon Interaction: $\chi/2\pi = 2.56$ MHZ, $K_3/2\pi =$ 0.5 kHz (27 of FIG. 5: square points)

| photon-number | n = 0 | n = 1 | n = 2 | n = 3 | n = 4 | n = 5 | n = 6 |
|---|---|---|---|---|---|---|---|
| target $E_{T,n}/2\pi$ (kHz) | 0 | 0 | 0 | 3 | 12 | 30 | 60 |
| engineered $E_n/2\pi$ (kHz) | 0 | 0 | 0 | 3 | 12 | 30 | 60 |
| $\delta_n/\chi$ | 1/2 | 1/2 | 1/2 | 1/2 | 1/2 | 1/4 | 1/2 |
| $\Omega_n/\chi$ | 0.0946 | 0.0694 | 0.0637 | 0.0640 | 0.0661 | 0.0704 | 0.0859 |

TABLE 2

Three-Photon Interaction: $\chi/2\pi = 2.56$ MHZ, $K_3/2\pi = 1$ kHz (27 of FIG. 5: circular points)

| photon-number | n = 0 | n = 1 | n = 2 | n = 3 | n = 4 | n = 5 | n = 6 |
|---|---|---|---|---|---|---|---|
| target $E_{T,n}/2\pi$ (kHz) | 0 | 0 | 0 | 6 | 24 | 60 | 120 |
| engineered $E_n/2\pi$ (kHz) | 0 | 0 | −1 | 8 | 25 | 61 | 122 |
| $\delta_n/\chi$ | 1/2 | 1/2 | 1/2 | 1/2 | 1/4 | 1/2 | 1/2 |
| $\Omega_n/\chi$ | 0.1422 | 0.1025 | 0.0935 | 0.0917 | 0.0995 | 0.1337 | 0.1172 |

TABLE 3

Parity-Dependent Energy: $\chi/2\pi = 2.56$ MHz, P = 20 kHz (28 of FIG. 5: square points)

| photon-number | n = 0 | n = 1 | n = 2 | n = 3 | n = 4 | n = 5 | n = 6 |
|---|---|---|---|---|---|---|---|
| target $E_{T,n}/2\pi$ (kHz) | −20 | 20 | −20 | 20 | −20 | 20 | −20 |
| engineered $E_n/2\pi$ (kHz) | −20 | 20 | −20 | 20 | −20 | 20 | −20 |
| $\delta_n/\chi$ | −1/4 | 1/4 | −1/2 | 1/4 | −1/4 | 1/4 | −1/2 |
| $\Omega_n/\chi$ | 0.00682 | 0.0568 | 0.0553 | 0.0349 | 0.0427 | 0.0427 | 0.0786 |

TABLE 4

Parity-Dependent Energy: $\chi/2\pi = 2.56$ MHz, P = 40 kHz (28 of FIG. 5: circular points)

| photonnumber | n = 0 | n = 1 | n = 2 | n = 3 | n = 4 | n = 5 | n = 6 |
|---|---|---|---|---|---|---|---|
| target $E_{T,n}/2\pi$ (kHz) | −40 | 40 | −40 | 40 | −40 | 40 | −40 |
| engineered $E_n/2\pi$ (kHz) | −40.5 | 40.5 | −40.5 | 40.5 | −40.5 | 40.5 | −40.5 |
| $\delta_n/\chi$ | −1/2 | 1/4 | −1/2 | 1/4 | −1/4 | 1/2 | −1/4 |
| $\Omega_n/\chi$ | 0.0232 | 0.0799 | 0.0826 | 0.0463 | 0.0469 | 0.0820 | 0.0816 |

TABLE 5

Error-Transparent Z-rotation: $\chi/2\pi = 2.56$ MHZ, $g_R/2\pi = 20$ kHz, $d_n = 2$ (29 of FIG. 5: square points and 30 of FIG. 5)

| photon-number | n = 0 | n = 1 | n = 2 | n = 3 | n = 4 | n = 5 | n = 6 |
|---|---|---|---|---|---|---|---|
| target $E_{T,n}/2\pi$ (kHz) | 20 | −20 | −20 | 20 | 20 | −20 | −20 |
| engineered $E_n/2\pi$ (kHz) | 20 | −20 | −20 | 20 | 20 | −20 | −20 |
| $\delta_n/\chi$ | 1/2 | −1/2 | −1/2 | 1/4 | 1/2 | −1/4 | −1/2 |
| $\Omega_n/\chi$ | 0.0862 | 0.0531 | 0.0753 | 0.0240 | 0.0554 | 0.0489 | 0.0893 |

TABLE 6

Error-Transparent Z-rotation: $\chi/2\pi = 2.56$ MHz, $g_R/2\pi = 40$ kHz, $d_n = 2$ (29 of FIG. 5: circular points)

| photon-number | n = 0 | n = 1 | n = 2 | n = 3 | n = 4 | n = 5 | n = 6 |
|---|---|---|---|---|---|---|---|
| target $E_{T,n}/2\pi$ (kHz) | 40 | −40 | −40 | 40 | 40 | −40 | −40 |
| engineered $E_n/2\pi$ (kHz) | 40 | −41 | −41 | 40 | 40 | −41 | −40 |
| $\delta_n/\chi$ | 1/2 | −1/4 | −1/2 | 1/4 | 1/4 | −1/4 | −1/2 |
| $\Omega_n/\chi$ | 0.1166 | 0.0600 | −0.0961 | 0.0308 | 0.0629 | 0.0678 | 0.1214 |

More Details of Microscopic Model and Kerr Corrections

The microscopic model of a resonator mode $\hat{a}$ coupled to another bosonic mode $\hat{d}$ with anharmonicity $\alpha$ is revisited below. Specifically, $$\hat{H} = \hbar\omega_a \hat{a}^\dagger \hat{a} + \hbar\omega_q \hat{d}^\dagger \hat{d} - \frac{\hbar\alpha}{2}\hat{d}^\dagger \hat{d}^\dagger \hat{d}\hat{d} + \hbar g(\hat{a}^\dagger \hat{d} + \hat{d}^\dagger \hat{a}). \tag{49}$$

For a small coupling g, perturbation theory may be used to estimate the frequency shifts as a function of photon-number in the resonator $n_a$ and the anharmonic mode $n_d$. Expanding up to the order of $g^4$ and keeping only $n_a=0, 1$ (states $|g\rangle, |e\rangle$), the generic Hamiltonian of the coupled system reads $$\hat{H} = \hbar\omega_a + \left(\frac{g^2}{\Delta} - \frac{g^4}{\Delta^3}\right)\hat{a}^\dagger \hat{a} + \hbar\omega_q\left(\frac{g^2}{\Delta} - \frac{g^4}{\Delta^3}\right)\hat{d}^\dagger \hat{d} - \frac{2\hbar g^2 \alpha}{\Delta(\Delta+\alpha)}\hat{a}^\dagger \hat{a}\hat{d}^\dagger \hat{d} -$$

$$\frac{\hbar g^4 \alpha}{\Delta^3(\alpha+2\Delta)}\hat{a}^\dagger \hat{a}^\dagger \hat{a}\hat{a} + \frac{4\hbar g^4 \alpha(\alpha^2 + 2\alpha\Delta + 2\Delta^2)}{\Delta^3(\Delta+\alpha)^3}\hat{a}^\dagger \hat{a}\hat{d}^\dagger \hat{d} +$$

$$\frac{\hbar g^4 2\alpha^2(3\alpha^3 + 11\alpha^2\Delta + 15\alpha\Delta^2 + 9\Delta^3)}{\Delta^3(\alpha+\Delta)^3(\alpha+2\Delta)(3\alpha+2\Delta)}\hat{a}^\dagger \hat{a}\hat{a}\hat{d}^\dagger \hat{d} + O(g^6).$$

Here $\Delta = \omega_a - \omega_q$.

Consider an off-resonantly driven coupled system with the photon self-Kerr K and the second-order dispersive shift $\chi'$, $$\hat{H}(t) = \hbar\omega_a \hat{a}^\dagger \hat{a} + \hbar\omega_q |e\rangle\langle e| - \hbar\chi \hat{a}^\dagger \hat{a}|e\rangle$$

$$\langle e| - \frac{\hbar K}{2}\hat{a}^\dagger \hat{a}^\dagger \hat{a}\hat{a} + \frac{\hbar\chi'}{2}\hat{a}^\dagger \hat{a}^\dagger \hat{a}\hat{a}|e\rangle\langle e| + \hbar\Omega(t)\hat{\sigma}_- + \hbar\Omega_*(t)\hat{\sigma}_+ \equiv$$

$$\hat{H}_0 + \hat{H}_K + \hbar\Omega(t)\hat{\sigma}_- + \hbar\Omega_*(t)\hat{\sigma}_+, \text{ here } \Omega(t) = \sum_m \Omega_m e^{i(\omega_q - m\chi + \delta_m)t}.$$

A tri-partition ansatz for the time-evolution operator is again assumed, $$\hat{U}_S(t_f, t_i) = e^{-i\hat{G}(t_f)} e^{-i\hat{H}_{\text{eff}}(t_f - t_i)/\hbar} e^{i\hat{G}(t_i)}, \tag{51}$$

and move to the interaction picture with the unitary transformation $\hat{U}=\exp(i(\hat{H}_0+\hat{H}_K)t/\hbar)$, the remaining drive term reads $$\hat{V}_I(t) = \sum_m \sum_n \hbar\left(\Omega_m e^{i((n-m)\chi + \delta_m - \chi'n(n-1)/2)t}|n\rangle\langle n|\hat{\sigma}_- + H.c.\right). \tag{52}$$

The time-dependent perturbation theory may again be used to calculate $\hat{U}_I(t_f, t_i)$ in powers of $\hat{V}_I$ to obtain the perturbative expansions $\hat{H}_{\text{eff}} = \hat{H}_{\text{eff}}^{(0)} + \hat{H}_{\text{eff}}^{(1)} + \hat{H}_{\text{eff}}^{(2)} + \ldots$ and $\hat{G}_I(t) = \hat{G}_I^{(0)}(t) + \hat{G}_I^{(1)}(t) + \hat{G}_I^{(2)}(t) + \ldots$, with additional contributions from the Kerr term $$\hat{H}_K = \frac{\hbar K}{2}\hat{a}^\dagger \hat{a}^\dagger \hat{a}\hat{a} + \frac{\hbar\chi'}{2}\hat{a}^\dagger \hat{a}^\dagger \hat{a}\hat{a}|e\rangle\langle e|.$$

For the zeroth order, it may be determined that $\hat{G}_I^{(0)}(t)=0$ and $\hat{H}_{\text{eff}}^{(0)} - \hat{H}_0 = 0$. For $\mathcal{O}(\hat{V})$, $$\hat{H}_{\text{eff}}^{(1)} = 0, \tag{53}$$

$$\hat{G}_I^{(1)}(t) = \sum_m \sum_n \frac{\Omega_m |n\rangle \langle n|\hat{\sigma}_- e^{i((n-m)\chi - \chi'n(n-1)/2 + \delta_m)t}}{i((n-m)\chi - \chi'n(n-1)/2 + \delta_m)} + H.c.. \tag{54}$$

For $\mathcal{O}(V^2)$, It may be found that $$\hat{H}_{\text{eff}}^{(2)} = -\sum_m \sum_n \frac{\hbar|\Omega_m|^2 |n\rangle \langle n|}{(n-m)\chi - \chi'n(n-1)/2 + \delta_m}\hat{\sigma}_z, \tag{55}$$

$$\hat{G}_I^{(2)} = -\sum_{m_1} \sum_{m_2 \neq m_1} \sum_n \tag{56}$$

$$\frac{\Omega_{m_1}\Omega_{m_2}^* |n\rangle \langle n|\hat{\sigma}_z e^{i(\delta_{m_1} - \delta_{m_2} - (m_1 - m_2)\chi)t}}{2i((n-m_1)\chi - \chi'n(n-1)/2 + \delta_{m_1})(\delta_{m_1} - \delta_{m_2} - (m_1 - m_2)\chi)} + H.c.$$

The third- and forth-order terms in the effective Hamiltonian are $$\hat{H}_{\text{eff}}^{(3)} = 0, \tag{57}$$

$$\hat{H}_{\text{eff}}^{(4)} = \sum_{m_1}\sum_{m_2}\sum_n \frac{\hbar|\Omega_{m_1}|^2|\Omega_{m_2}|^2|n\rangle\langle n|\hat{\sigma}_z}{((n-m_1)\chi + \delta_{m_1} - \chi'^n(n-1)/2)} - \tag{58}$$

$$((n-m_2)\chi - \chi'^n(n-1) + \delta_{m_2})^2$$

$$\sum_{m_1}\sum_{m_2 \neq m_1}\sum_n \frac{\hbar|\Omega_{m_1}|^2|\Omega_{m_2}|^2|n\rangle\langle n|\hat{\sigma}_z}{((n-m_1)\chi - \chi'^n(n-1)/2) + \delta_{m_1})^2} +$$

$$(\delta_{m_1} - \delta_{m_2} - (m_1 - m_2)\chi)$$

$$\frac{\sum_{m_1,m_2,m_3,m_4}\sum_n \hbar\Omega_{m_1}\Omega_{m_2}^*\Omega_{m_3}\Omega_{m_4}^*|n\rangle\langle n|\hat{\sigma}_z}{((n-m_4)\chi - \chi'^n(n-1)/2) + \delta_{m_4})},$$

$$(\delta_{m_1} - \delta_{m_2} - (m_1 - m_2)\chi)$$

$$((n-m_1)\chi - \chi'^n(n-1)/2) + \delta_{m_1})$$

where the last term satisfies the condition $\delta_{m_1} - m_1\chi + \delta_{m_3} - m_3\chi = \delta_{m_2} - m_2\chi + \delta_{m_4} - m_4\chi$, and $m_1 \neq m_2 \neq m_3 \neq m_4$ or $m_1 = m_3 \neq m_2 \neq m_4$ or $m_2 = m_4 \neq m_1 \neq m_3$.

(i) Optimized PND Parameters with Kerr and Additional Simulations

In this subsection tables of optimized PND Hamiltonian engineering parameters with the additional Kerr term are described. All the engineered frequency shifts are subject to a Fourier transformation precision of ±0.5 kHz.

Figure 10:
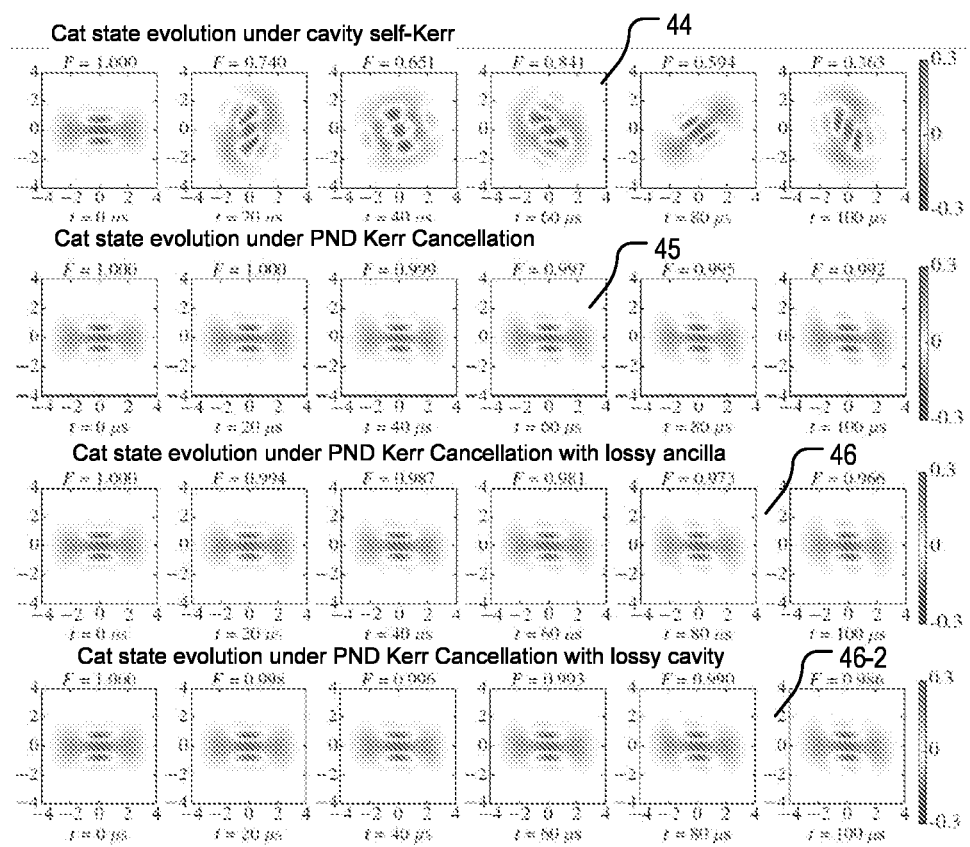
FIG. 10 illustrates example Wigner function snapshots and cat fidelitiies with self-Kerr nonlinearity and with canceled self-Kerr nonlinearity.
Figure 11:
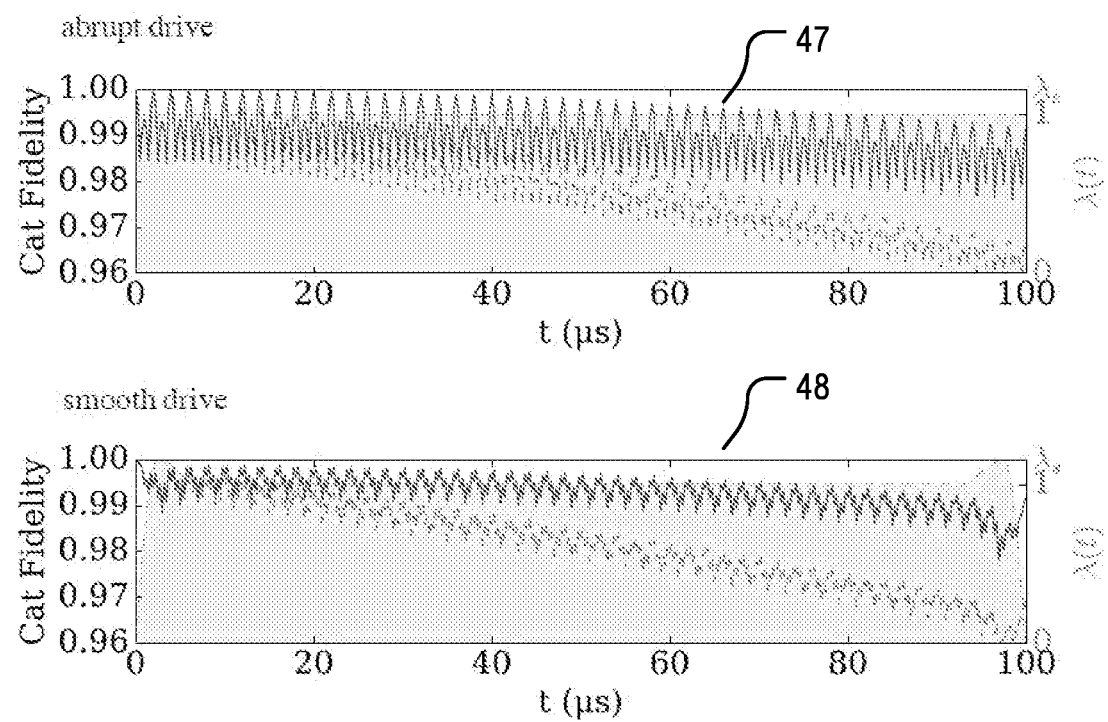
FIG. 11 illustrates example cat state fidelity during a Kerr cancellation operation.

Additional simulations of the cat state evolution under PND Kerr cancellation is shown in FIG. 10 and FIG. 11. It is assumed that the system starts with an even cavity cat state $$\frac{1}{\sqrt{2}}(|\alpha_c\rangle + |-\alpha_c\rangle)$$

add the qubit in nus ground state then simulate the state evolution in the rotating frame with $\hat{U} = \exp(i(\omega_a \hat{a}^\dagger \hat{a} + \omega_q |e\rangle\langle e|)t)$. With PND Kerr cancellation, the cat state is preserved at a high fidelity ≈99.2% even after a long time t=100 μs. More specifically, Wigner function snap shots and cat fidelities under cavity self-Kerr effect, under PND Kerr cancellation, and under PND Kerr cancellation with a lossy ancilla qubit and loss cavity are shown in 44, 45, 46, and 46-2 of FIG. 10, respectively, with different fidelities. An abrupt PND drive with parameters shown in table 7. is used, and it is assume as an example a qubit relaxation rate of $\Gamma_q/2\pi=3$ kHz and a cat size of $\alpha_c=\sqrt{2}$. The snap shots are chosen at multiples of the micromotion period $T_M=8\pi/\chi=2$ μs.

Cat state fidelity during the Kerr cancellation operation by abruptly turning on the PND drive and smoothly turning on and off the PND drive is described in Eq. (34) and (35) and are shown in 47 and 48 of FIG. 11, respectively. The cat fidelity as a function of time is shown as solid curves (without ancilla qubit relaxation) and dashed curves (with ancilla qubit relaxation). The ramping function $\lambda(t)$ in shown as the shaded dash curve. Here, parameters shown in table 7. are used as an example, and it is assumed that $\Gamma_q/2\pi=3$ kHz, $\alpha_c=\sqrt{2}$, and $T_s=2.5$ μs. At the end of the operation, the final cat fidelity is 99.180% for the abrupt drive and 99.184% for the smooth drive. The additional infidelity of parameters $\chi$, $\{\Omega\}$, and $\{\delta\}$ is shown. The insets indicate the corresponding cavity self-Kerr value relative to K with $K/2\pi=3$ kHz. Here, it is assumed as an example that abrupt PND drive $\lambda(t)=1$ is used, and $\chi_0$, $\{\Omega_0\}$ and $\{\delta_0\}$ are the parameters used in table 7. It may be inferred that the micromotion amplitude scales as $|\Omega^2/\chi^2|$ and that the micromotion period is $T_M=8\pi/\chi$ as predicted.

Figure 13:
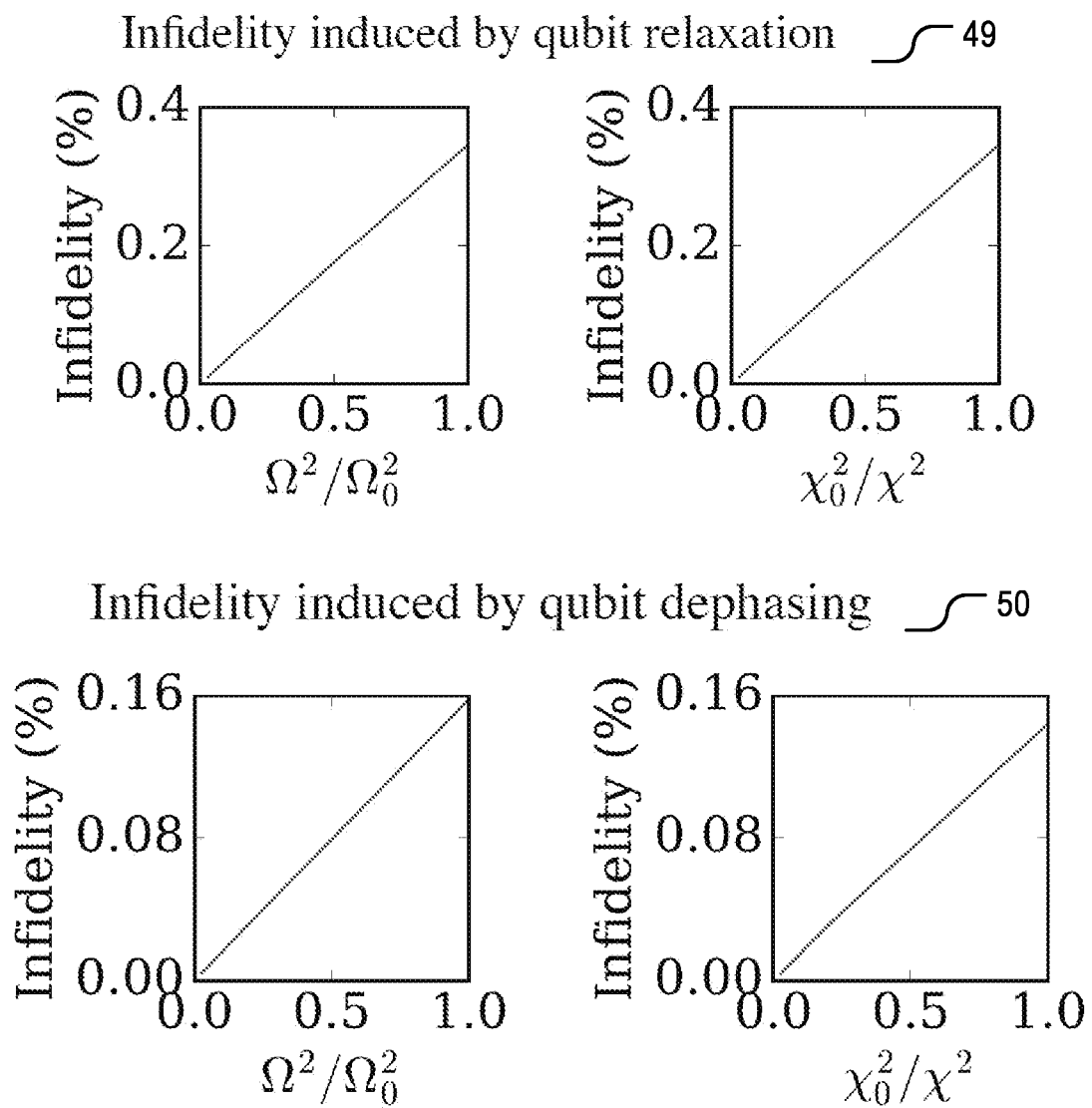
FIG. 13 illustrates cat infidelity induced by ancilla qubit errors during photon-number dependent Kerr cancellation.

Further, cat infidelity induced by ancilla qubit errors during PND Kerr cancellation are shown in FIG. 13. In particular, 49 of FIG. 13 shows values of cat infidelity at time t=12 μs with qubit relaxation at a rate $\Gamma_q/2\pi=3$ kHz subtracted by the cat infidelity without qubit relaxation. The left panel has a fixed $\Omega=\Omega_0$ with varying $\chi$, and the right panel has a fixed $\chi=\chi_0$ with varying $\Omega$. 50 of FIG. 13 shows values of cat infidelity at time t=12 μs with qubit dephasing at a rate $\Gamma_\phi/2\pi=3$ kHz subtracted by the cat infidelity without qubit dephasing. The left panel has a fixed $\Omega=\Omega_2$ with varying $\chi$, and the right panel has a fixed $\chi=\chi_0$ with varying $\Omega$. Here it is assumed a abrupt PND drive of $\lambda(t)=1$, $\chi_0$, $\{\Omega_0\}$ and $\{\delta_0\}$ are the parameters used in table 7. $K/2\pi=(\Omega^2\chi_0/\Omega_0^2\chi)3$ kHz, and a cat size $\alpha_c=\sqrt{2}$.

TABLE 7

Kerr Cancellation: $\chi/2\pi = 2$ MHz, $K/2\pi = 3$ kHz, $\chi'/2\pi = 6$ kHz (FIG. 6 (b-c))

| photon-number | n = 0 | n = 1 | n = 2 | n = 3 | n = 4 | n = 5 | n = 6 |
|---|---|---|---|---|---|---|---|
| $E_{T,n}/2\pi$ (kHz) | 0 | 0 | 3 | 9 | 18 | 30 | 45 |
| $E_n/2\pi$ (kHz) | 0 | 0 | 3 | 9 | 18 | 30.25 | 46.25 |
| $\delta_n/\chi$ | 1/2 | 1/2 | 1/2 | 1/2 | 1/2 | 1/4 | 1/4 |
| $\Omega_n/\chi$ | 0.0883 | 0.0658 | 0.0635 | 0.0639 | 0.0620 | 0.0534 | 0.0606 |

TABLE 8

Error-Transparent Z-rotation with Kerr Cancellation:
$\chi/2\pi = 2$ MHz, $g_R = 20$ kHz, $K/2\pi = 3$ kHz, $\chi'/2\pi = 6$ kHz

| photon-number | n = 0 | n = 1 | n = 2 | n = 3 | n = 4 | n = 5 | n = 6 |
|---|---|---|---|---|---|---|---|
| $E_{T,n}/2\pi$ (kHz) | 20 | −20 | −17 | 29 | 38 | 10 | 25 |
| $E_n/2\pi$ (kHz) | 20 | −20 | −17 | 29 | 38 | 9 | 24 |
| $\delta_n/\chi$ | 1/2 | −1/2 | −1/4 | 1/2 | 1/4 | 1/2 | 1/2 |
| $\Omega_n/\chi$ | 0.0949 | 0.0659 | 0.0344 | 0.0838 | 0.0588 | 0.0257 | 0.0527 | induced by ancilla relaxation is 2.568% for the abrupt drive and 2.276% for the smooth drive. The smooth ramping scheme reduces the qubit-induced dephasing as predicted. In the middle of the operation (after the ramp-up period and before the ramp-down period), the cat state fidelity is higher for the case of abrupt drive at each micromotion period because the final kick is canceled out by the initial kick.

Figure 12:
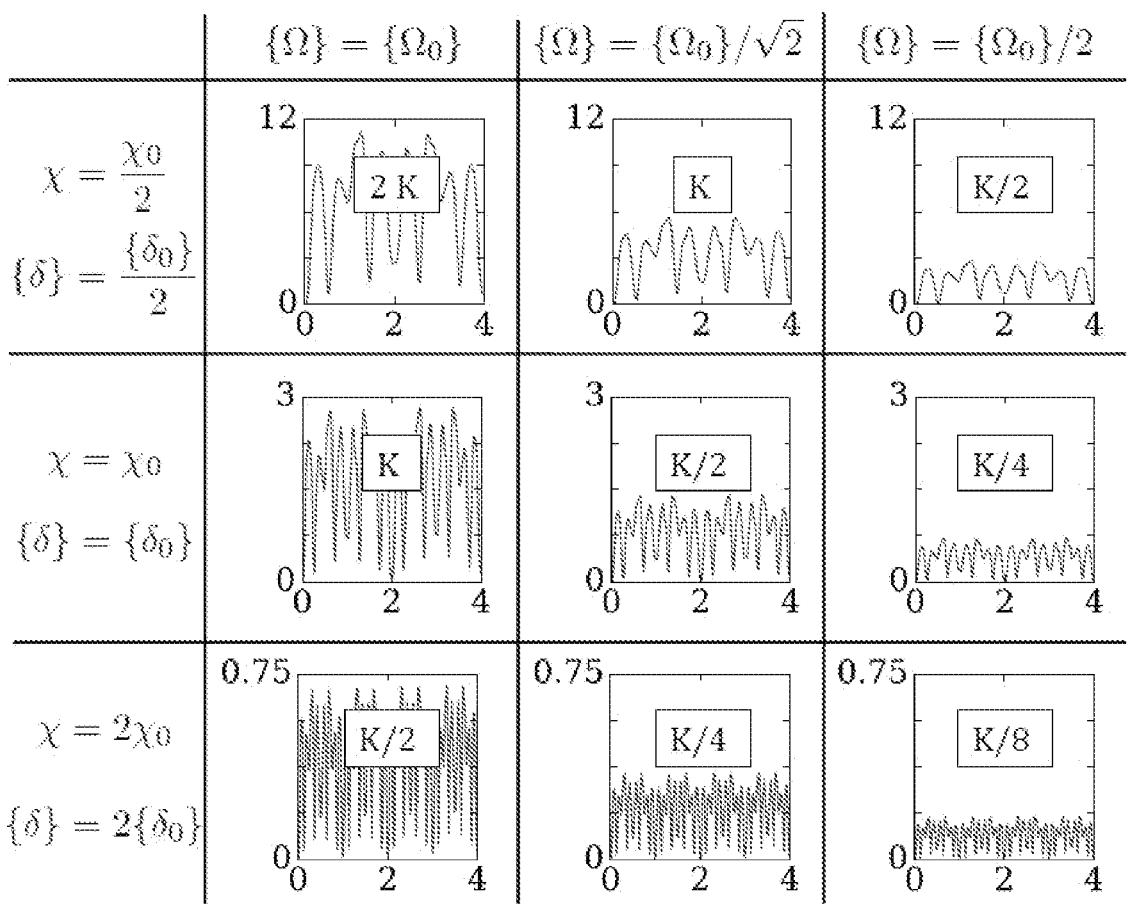
FIG. 12 illustrates example micromotion of the cat infidelity under photonnumber dependent Kerr cancellation.

In FIG. 12 and FIG. 13, the micromotion and the qubit-induced infidelity for PND Kerr cancellation are shown. It is shown that the amplitude of the micromotion and the qubit-induced infidelity both scale as $\Omega^2/\chi^2$ as predicted. The Kerr cancellation with $\chi'=2K$ is used as a special example case such that both the cavity self-Kerr and the second-order dispersive shift are cancelled out by the engineered Hamiltonian and thus there is a perfect micromotion periodicity $T_M$ unperturbed by the total energy.

More specifically, micromotion of the cat state infidelity under PND Kerr cancellation is shown in FIG. 12. In this table of plots, the infidelity (x-axis, %) of a cat state (cat size $\alpha_c=\sqrt{2}$) as a function of time (y-axis, μs) with varying sets More Details for Hamiltonian Engineering for Two Coupled Cavities Consider two cavity modes $\hat{a}$ and $\hat{b}$ dispersively coupled to two ancilla qubits $\hat{\sigma}^a$ and $\hat{\sigma}^b$ respectively, and to another qubit $\hat{\sigma}^c$ jointly with a dispersive shift $\chi_c$, assumed as an example to be equal for both modes, $$\hat{H}_0 = \hbar\omega_a \hat{a}^\dagger \hat{a} + \hbar\omega_{q,a} | e_a \rangle \quad (59)$$

$$\langle e_a|-\hbar\chi_a \hat{a}^\dagger \hat{a} | e_a \rangle| \langle e_a|+\hbar\omega_b \hat{b}^\dagger \hat{b} + \hbar\omega_{q,b} | e_b \rangle$$

$$\langle e_b|-\hbar\chi_b \hat{b}^\dagger \hat{b} | e_b \rangle \langle e_b|+\hbar\omega_{q,c} | e_c \rangle \langle e_c|-\hbar\chi_c (\hat{a}^\dagger \hat{a} + \hat{b}^\dagger \hat{b}) | e_c \rangle \langle e_c|.$$

Drive term can be added as $$\hat{H}_d(t) = \hbar\Omega_a(t)\hat{\sigma}_-^a + \hbar\Omega_a^*(t)\hat{\sigma}_+^a + \hbar\Omega_b(t)\hat{\sigma}_-^b + \hbar\Omega_b^*(t)\hat{\sigma}_+^b + \hbar\Omega_c(t)\hat{\sigma}_-^c + \hbar\Omega_c^*(t)\hat{\sigma}_+^c \quad (60)$$

with $\Omega_a(t)=\Sigma_{m_a} \Omega_{m_a} e^{i(\omega_{q,a}-m_a\chi_a+\delta m_a)t}$, $\Omega_b(t)=\Sigma_{m_b} \Omega_{m_b} e^{i(\omega_{q,b}-m_b\chi_b+\delta m_b)t}$, and $\Omega_c(t)=\Sigma_{m_c} \Omega_{m_c} e^{i(\omega_{q,c}-m_c\chi_c+\delta m_c)t}$ to engineer Hamiltonian for the two coupled cavities, assuming $|\Omega_{m_i}| \ll \chi_i, |\delta_{m_i}|$, i=a, b, c. Specifically, the effective Hamiltonian may be of the form $\hat{H}_{\mathit{eff}}=\hat{H}_{\mathit{eff}}^{(a)}+\hat{H}_{\mathit{eff}}^{(b)}+\hat{H}_{\mathit{eff}}^{(c)}$ with second order terms $$\hat{H}_{\mathit{eff}}^{(a,2)} = -\sum_{m_a}\sum_{n_a} \frac{\hbar|\Omega_{m_a}|^2 |n_a\rangle\langle n_a|}{(n_a - m_a)\chi_a + \delta_{m_a}} \hat{\sigma}_z^a, \quad (61)$$

$$\hat{H}_{\mathit{eff}}^{(b,2)} = -\sum_{m_b}\sum_{n_b} \frac{\hbar|\Omega_{m_b}|^2 |n_b\rangle\langle n_b|}{(n_b - m_b)\chi_b + \delta_{m_b}} \hat{\sigma}_z^b, \quad (62)$$

$$\hat{H}_{\mathit{eff}}^{(c,2)} = -\sum_{m_c}\sum_{n_a}\sum_{n_b} \frac{\hbar|\Omega_{m_c}|^2 |n_a, n_b\rangle\langle n_a n_b|}{(n_a + n_b - m_c)\chi_c + \delta_{m_c}} \hat{\sigma}_z^c. \quad (63)$$

The fourth order terms can be found in the description above. The engineered Hamiltonian is $$\hat{H}_E = \langle g_a g_b g_c | \hat{H}_{\mathit{eff}} | g_a g_b g_c \rangle = \sum_{n_a,n_b} \hbar E_{n_a n_b} |n_a n_b\rangle \langle n_a n_b| = \quad (64)$$

$$\sum_{n_a,n_b} \hbar(E_{c,n_a+n_b} + E_{a,n_a} + E_{b,n_b}) |n_a n_b\rangle \langle n_a n_b| \approx$$

$$\sum_{m_a}\sum_{n_a} \frac{\hbar|\Omega_{m_a}|^2 |n_a\rangle\langle n_a|}{(n_a - m_a)\chi_a + \delta_{m_a}} + \sum_{m_b}\sum_{n_b} \frac{\hbar|\Omega_{m_b}|^2 |n_b\rangle\langle n_b|}{(n_b - m_b)\chi_b + \delta_{m_b}} +$$

$$\sum_{m_c}\sum_{n_a}\sum_{n_b} \frac{\hbar|\Omega_{m_c}|^2 |n_a, n_b\rangle\langle n_a, n_b|}{(n_a + n_b - m_c)\chi_c + \delta_{m_c}}.$$

(i) Error-Transparent Controlled-Z-Rotation

The form of the engineered Hamiltonian does not have the full degree of freedom to create arbitrary structure of $E_{n_a n_b}$, but is enough to design error-transparent controlled-rotation along the Z axis for implementing CPHASE gate on rotational-symmetric bosonic codes. Specifically, by solving for target frequency shifts $$E_{T,n_a} = \begin{cases} g_{cR}/4 & n_a \bmod (2d_{n_a}) = 0, 2d_{n_a} - 1, \ldots, d_{n_a} + 1 \\ -g_{cR}/4 & n_a \bmod (2d_{n_a}) = d_{n_a}, d_{n_a} - 1, \ldots, 1 \end{cases}, \quad (65)$$

which takes $\{I, \hat{a}, \ldots \hat{a}^{d_{n_a}-1}\}|0_a\rangle_L \to e^{-ig_{cR}t/4}\{I, \hat{a}, \ldots \hat{a}^{d_{n_a}-1}\}|0_a\rangle_L$ and $\{I, \hat{a}, \ldots \hat{a}^{d_{n_a}-1}\}|1_a\rangle_L \to e^{ig_{cR}t/4}\{I, \hat{a}, \ldots \hat{a}^{d_{n_a}-1}\}|1_a\rangle_L$, $$E_{T,n_b} = \begin{cases} g_{cR}/4 & n_b \bmod (2d_{n_b}) = 0, 2d_{n_b} - 1, \ldots, d_{n_b} + 1 \\ -g_{cR}/4 & n_b \bmod (2d_{n_b}) = d_{n_b}, d_{n_b} - 1, \ldots, 1 \end{cases}, \quad (66)$$

which takes $\{I, \hat{b}, \ldots \hat{b}^{d_{n_b}-1}\}|0_b\rangle_L \to e^{-ig_{cR}t/4}\{I, \hat{b}, \ldots \hat{b}^{d_{n_b}-1}\}|0_b\rangle_L$ and $\{I, \hat{b}, \ldots \hat{b}d^{n_b-1}\}|1_b\rangle_L \to e^{ig_{cR}t/4}\{I, \hat{b}, \ldots \hat{b}^{d_{n_b}-1}\}|1_b\rangle_L$, and $$E_{T,n_a+n_b} = \begin{cases} -g_{cR}/2 & n_a + n_b \bmod (d_{n_a} + d_{n_b}) = \\ & 0, d_{n_a} + d_{n_b} - 1, \ldots, d_{n_a} + d_{n_b} + 1, \\ 0 & \text{otherwise} \end{cases} \quad (67)$$

which takes $\{I, \hat{a}^{l_a}\hat{b}^{l_a}\}|0_a 0_b\rangle_L \to e^{ig_{cR}t/2}\{I, \hat{a}^{l_a}\hat{b}^{l_b}\}|0_a 0_b\rangle_L$, and $\{I, \hat{a}^{l_a}\hat{b}^{l_b}\}|1_a 1_b\rangle_L \to e^{ig_{cR}t/2}\{I, \hat{a}^{l_a}\hat{b}^{l_b}\}|1_a 1_b\rangle_L$ for all $l_a=0, 1, \ldots, d_n-1$ and $l_b=0, 1, \ldots, d_n-1-l_a$. Within a total number distance $d_n = \min(d_{n_a}, d_{n_b})$, the overall Hamiltonian should accumulate the same phase for $|1_a 1_b\rangle_L$ and its error states while keeping $|0_a 0_b\rangle_L, |0_a 1_b\rangle_L, |1_a 0_b\rangle_L$ and their error states unchanged.

Further shown below are tables of optimized parameters for implementing such error-transparent controlled-rotation with $d_{n_a}=d_{n_b}=d_n=2$. All the engineered frequency shifts are subject to a Fourier transformation precision of ±0.5 kHz.

TABLE 9

Error-Transparent Controlled-Rotation (drives on qubit $\hat{\sigma}^a$): $\chi_a/2\pi$ = 2.56 MHz

| photon-number | $n_a = 0$ | $n_a = 1$ | $n_a = 2$ | $n_a = 3$ | $n_a = 4$ |
|---|---|---|---|---|---|
| $E_{T, n_a}/2\pi$ (kHz) | 5 | −5 | −5 | 5 | 5 |
| $E_{a, n_a}/2\pi$ (kHz) | 5 | −5 | −5 | 5 | 5 |
| $\delta_{n_a}/\chi$ | 1/2 | −1/4 | −1/2 | −1/2 | −1/2 |
| $\Omega_{n_a}/\chi$ | 0.0393 | 0.0212 | 0.0365 | 0.0243 | 0.0175 |

TABLE 10

Error-Transparent Controlled-Rotation (drives on qubit $\hat{\sigma}^b$): $\chi_b/2\pi$ = 2.56 MHz

| photon-number $n_b$ | $n_b = 0$ | $n_b = 1$ | $n_b = 2$ | $n_b = 3$ | $n_b = 4$ |
|---|---|---|---|---|---|
| $E_{T, n_b}/2\pi$ (kHz) | 5 | −5 | −5 | 5 | 5 |
| $E_{b, n_b}/2\pi$ (kHz) | 5 | −5 | −5 | 5 | 5 |
| $\delta_{n_b}/\chi$ | 1/2 | −1/4 | −1/2 | −1/2 | −1/2 |
| $\Omega_{n_b}/\chi$ | 0.0393 | 0.0212 | 0.0365 | 0.0243 | 0.0175 |

TABLE 11

Error-Transparent Controlled-Rotation (drives on qubit $\hat{\sigma}^c$): $\chi_c/2\pi$ = 2.56 MHz

| $n_c = n_a + n_b$ | $n_c = 0$ | $n_c = 1$ | $n_c = 2$ | $n_c = 3$ | $n_c = 4$ | $n_c = 5$ | $n_c = 6$ | $n_c = 7$ | $n_c = 8$ |
|---|---|---|---|---|---|---|---|---|---|
| $E_{T, n_b}/2\pi$ (kHz) | −10 | 0 | 0 | −10 | −10 | 0 | 0 | −10 | −10 |
| $E_{b, n_b}/2\pi$ (kHz) | −10 | 0 | 0 | −10 | −10 | 0 | 0 | −10 | −10 |
| $\delta_{n_b}/\chi$ | −1/2 | 1/4 | 1/2 | −1/4 | −1/2 | −1/4 | −1/4 | −1/2 | −1/2 |
| $\Omega_{n_b}/\chi$ | 0.028 | 0.020 | 0.027 | 0.025 | 0.042 | 0.026 | 0.0049 | 0.038 | 0.063 |

In summary, a toolbox is implemented and developed for photon-number dependent Hamiltonian engineering by off-resonantly driving ancilla qubit(s). A general formalism to design and optimize the control drives for engineering arbitrary single-cavity target Hamiltonian and performing quantum gates is provided, with examples including three-photon interaction, parity-dependent energy, error-transparent Z-rotation for rotation-symmetric bosonic qubits, and cavity self-Kerr cancellation. This scheme is also generalized to implement error-transparent controlled-rotation between two cavities. The flexible and thus highly nonlinear engineered Hamiltonian for photons admits versatile applications for quantum simulation and quantum information processing. These schemes can be implemented with dispersively coupled microwave cavities and transmon qubits in the cQED platform.

The description and accompanying drawings above provide specific example embodiments and implementations. Drawings containing device structure and composition, for example, are not necessarily drawn to scale unless specifically indicated. Subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, or systems. Accordingly, embodiments may, for example, take the form of hardware, software, firmware or any combination thereof.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed:

1. A method for controlling a quantum interaction in a cavity system comprising a first electromagnetic resonator coupled to a first ancilla quantum bit (qubit), the method comprising:
   determining a target Hamiltonian associated with the cavity system dependent on one or more photon-number states of the first electromagnetic resonator;
   designing an external electromagnetic field for driving the first ancilla qubit to achieve an interaction between the external field and the cavity system that emulates the target Hamiltonian while minimizing a decoherence of the one or more photon-number states of the first electromagnetic cavity due to an excitation of the first ancilla qubit by the external electromagnetic field; and
   driving the first ancilla qubit with the external electromagnetic field designed to induce a quantum evolution of the cavity system to a quantum state.

2. The method of claim 1 wherein:
   the first electromagnetic resonator is associated with a cavity resonance and the first ancilla qubit is associated with a qubit resonance between a ground state and an excited state; and
   the first electromagnetic resonator and the ancilla qubit are coupled via a dispersive coupling.

3. The method of claim 2, wherein the qubit resonance of the first ancilla qubit is split into a series of sub-resonances depending on photon-number states of the first electromagnetic resonator due to the dispersive coupling.

4. The method of claim 3, wherein minimizing the decoherence of the one or more photon-number states of the electromagnetic cavity comprises minimizing a population of the excited state by the external electromagnetic field.

5. The method of claim 3, wherein minimizing the decoherence of the one or more photon-number states of the electromagnetic cavity comprises minimizing a micromotion of the first ancilla qubit induced by the external electromagnetic field.

6. The method of claim 3, wherein designing the external electromagnetic field comprises determining a number of frequency components, and field amplitudes and frequency detunings from the sub-resonances for the frequency components.

7. The method of claim 6, wherein designing the external electromagnetic field comprises assigning a predetermined set of detunings from the sub-resonances and adjusting the field amplitudes of the frequency components to minimize a population of the exited state or micromotion of the ancilla qubit.

8. The method of claim 7, wherein the predetermined set of detunings are each commensurate with a coupling strength between the first ancilla qubit and the first electromagnetic resonator.

9. The method of claim 1, wherein the target Hamiltonian comprises one or more photon-photon interactions.

10. The method of claim 9, wherein the target Hamiltonian comprises a photon-photon interaction that cancels a self-Kerr nonlinearity in the first electromagnetic resonator.

11. The method of claim 1, wherein the quantum evolution comprises a quantum logic operation or a quantum simulation of a many-body quantum system.

12. The method of claim 11, wherein the quantum logic operation comprises an error-transparent Z-rotation operation.

13. The method of claim 1, wherein:
the cavity system further comprises a second electromagnetic resonator coupled to the first electromagnetic resonator, a second ancilla qubit coupled to the second electromagnetic resonator, and a third qubit coupled to the first electromagnetic resonator and the second electromagnetic resonator; and
the target Hamiltonian is further dependent on one or more photon-number states of the second electromagnetic resonator in addition to the one or more photon-number states of the first electromagnetic resonator.

14. The method of claim 13 wherein the target Hamiltonian comprises interactions between photons in the first electromagnetic resonator and the photons in the second electromagnetic resonator.

15. The method of claim 14, wherein the quantum evolution comprises a controlled-Z-rotation operation for realizing a controlled-phase quantum gate.

16. The method of claim 1, wherein the electromagnetic resonator comprises a planar or three-dimensional superconducting microwave resonator.

17. The method of claim 16, wherein the ancilla qubit comprises a superconducting transmon qubit.

18. The method of claim 17, wherein the superconducting microwave resonator and the superconducting transmon are capacitively coupled.

19. A system for controlling a quantum interaction, comprising:
a cavity system comprising a first electromagnetic resonator coupled to a first ancilla quantum bit (qubit);
an electromagnetic field generator; and
a controller coupled to the cavity system and the electromagnetic field generator, wherein the controller is configured to perform the methods of claim 1.

20. A system for controlling a quantum interaction, comprising:
a cavity system comprising a first electromagnetic resonator coupled to a first ancilla quantum bit (qubit);
an electromagnetic field generator; and
a controller coupled to the cavity system and the electromagnetic field generator, wherein the controller is configured to:
determine a target Hamiltonian associated with the cavity system dependent of one or more photon-number states of the first electromagnetic resonator;
optimize an external electromagnetic field for driving the first ancilla qubit to achieve an interaction between the external field and the cavity system that emulate the target Hamiltonian while minimizing a decoherence of the one or more photon-number states of the first electromagnetic cavity due to an excitation of the first ancilla qubit by the external electromagnetic field; and
trigger the electromagnetic field generator to generate the optimized external electromagnetic field to drive the first ancilla qubit to induce a quantum evolution of the cavity system to a quantum state.

* * * * *